(12) United States Patent
Leavitt et al.

(10) Patent No.: US 11,972,417 B2
(45) Date of Patent: Apr. 30, 2024

(54) ELECTRONIC PAYMENT PROCESSING USING ADJUSTED INTERCHANGE RATE

(71) Applicant: Boost Payment Solutions, Inc., New York, NY (US)

(72) Inventors: Dean Michael Leavitt, New York, NY (US); James Edward Lister, New York, NY (US)

(73) Assignee: Boost Payment Solutions, Inc., New York, NY (US)

( * ) Notice: Subject to any disclaimer, the term of this patent is extended or adjusted under 35 U.S.C. 154(b) by 0 days.

(21) Appl. No.: 18/057,415

(22) Filed: Nov. 21, 2022

(65) Prior Publication Data

US 2023/0077411 A1    Mar. 16, 2023

Related U.S. Application Data

(63) Continuation of application No. 16/725,595, filed on Dec. 23, 2019, now Pat. No. 11,514,435, which is a continuation-in-part of application No. 16/024,114, filed on Jun. 29, 2018, now Pat. No. 11,488,142, which is a continuation-in-part of application No. 13/649,935, filed on Oct. 11, 2012, now abandoned.

(60) Provisional application No. 62/784,594, filed on Dec. 24, 2018, provisional application No. 61/546,412, filed on Oct. 12, 2011.

(51) Int. Cl.
*G06Q 20/38* (2012.01)

(52) U.S. Cl.
CPC ..... *G06Q 20/381* (2013.01); *G06Q 20/38215* (2013.01); *G06Q 20/3827* (2013.01)

(58) Field of Classification Search
CPC .......... G06Q 20/381; G06Q 20/38215; G06Q 20/3827; G06Q 20/02; G06Q 20/3823; G06Q 20/12
See application file for complete search history.

(56) References Cited

U.S. PATENT DOCUMENTS

| | | | | |
|---|---|---|---|---|
| 2002/0143655 | A1* | 10/2002 | Elston | G06Q 20/04 705/26.81 |
| 2008/0222046 | A1* | 9/2008 | McIsaac | G07F 7/1016 705/64 |
| 2009/0164328 | A1* | 6/2009 | Bishop | G06Q 20/207 705/19 |

(Continued)

*Primary Examiner* — Patrick McAtee
*Assistant Examiner* — Nakia Leffall-Allen

(57) ABSTRACT

An encrypted payment message is received from a buyer relating to a transaction with a merchant. The payment message is parsed using a first parsing algorithm to obtain merchant identifying information. The merchant identifying information is associated with at least a second parsing algorithm or at least one settlement algorithm. The payment message is parsed using the second parsing algorithm to obtain payment information for the transaction. A first settlement algorithm is applied to the payment information to determine an adjusted interchange rate. The payment information including the adjusted interchange rate is submitted to a third party settlement processor on behalf of the merchant, using a payment algorithm. A second settlement algorithm applied to the payment information determines a buyer rebate which can be submitted to the settlement processor. A transaction result is reported to at least one of the merchant or the buyer.

20 Claims, 11 Drawing Sheets

(56) References Cited

U.S. PATENT DOCUMENTS

| | | | | |
|---|---|---|---|---|
| 2010/0205095 | A1* | 8/2010 | Ostrovsky | G06Q 40/12 709/204 |
| 2011/0320354 | A1* | 12/2011 | Coon | G06Q 20/40 235/380 |
| 2012/0158566 | A1* | 6/2012 | Fok | G06Q 40/00 705/35 |
| 2012/0233073 | A1* | 9/2012 | Salmon | G06Q 20/384 705/44 |
| 2012/0303425 | A1* | 11/2012 | Katzin | G06Q 20/4016 705/16 |
| 2013/0097081 | A1* | 4/2013 | Leavitt | G06Q 20/02 705/44 |
| 2013/0218657 | A1* | 8/2013 | Salmon | G06Q 30/0215 705/14.29 |
| 2014/0279524 | A1* | 9/2014 | Slusser | G06Q 20/0855 705/44 |
| 2017/0300879 | A1* | 10/2017 | Subramanian | G06Q 20/00 |
| 2022/0143655 | A1* | 5/2022 | Dobashi | B08B 7/0035 |

* cited by examiner

280, 280A → To: janedoe@ABCCorp.com

From: Boost Payment Solutions<boostreporting@boostb2b.com> ← 280, 280B

Date: 11-MAR-12

This message is sent to you as a confirmation that the following charge has been authorized and settled into the following designated depository account (DDA account #). Should you have any questions regarding this payment, please call Boost Payment Solution at (888) 222-7122. ← 475

The details of this payment are as follows:

| Payment Date | Payment No. | Invoice No. | Amount | Currency | Payer Code | Event Code |
|---|---|---|---|---|---|---|
| 11-MAR-12 | 3010006353 | ABC1231239 | $5.00 | USD | ABC | |
| 11-MAR-12 | 3010006353 | ABC1231240 | 5.00 | USD | ABC | |
| | | Total Amount: | $10.00 | | | |

385 ↗  480 ↗  420 ↗  340 ↘
390 ↘

\* Event Code may include GL, taxes, adjustments or any other details provided by payer.

155 →

| | | |
|---|---|---|
| | 033-0072151479 | |
| TransID | 033-0072151479 | |
| Custid | 1225556 | |
| Action | sale | |
| Status | approved | |
| Response Code | 00 | |
| Description | Approved Completed Dynamic Key Accepted | |
| Transaction Date | 06-13-2018 16:27:31 PDT | — 385 |
| Account | xxxxxxxxxxxx-8888 | |
| Expiration Date | 08/2020 | — 345 |
| Media Type | MasterCard | |
| Amount | $78,981.27 | — 390 |
| AVS | n | — 105 |
| Name | KRISPY KREME NA VCA | |
| ShipTo Zip | 10017 | |
| ShipTo Country | 840 | |
| Ticket | 1143 | |
| Operator | JLister | |
| Authcode | 058533 | |
| Entry Mode | Key Entered | — 410 |
| Bank Settlement Number | 444 | |
| Product Information | | |
| Purchase Order Number / Customer Code | 1143 | |
| Total Shipping & Handling | $0.00 | |
| Tax Identifier | Not Provided | |
| Tax | $0.00 | |
| Product Code | 1143 | |
| Price | $78,981.27 | — 390 |
| Quantity | 1 | |
| Product Description | Invoices Invoices | |
| Unit of Measure | Each | |
| Discount Per Item | $0.00 | |
| Associated Transactions | | |
| | 460 | |

ELECTRONIC PAYMENT PROCESSING USING ADJUSTED INTERCHANGE RATE

RELATED APPLICATION

This continuation application claims the benefit of and priority to U.S. patent application Ser. No. 16/725,595 filed Dec. 23, 2019, U.S. Provisional Application No. 62/784,594 filed Dec. 24, 2018, U.S. patent application Ser. No. 16/024,114 filed Jun. 29, 2018, U.S. patent application Ser. No. 13/649,935 filed Oct. 11, 2012, and U.S. Provisional Application No. 61/546,412, filed Oct. 12, 2011, the contents of which are hereby incorporated by reference in their entirety. U.S. patent application Ser. No. 16/725,595 filed Dec. 23, 2019 claims the benefit of and priority to U.S. Provisional Application No. 62/784,594 filed Dec. 24, 2018, and is a continuation-in-part of U.S. patent application Ser. No. 16/024,114 filed Jun. 29, 2018. U.S. patent application Ser. No. 16/024,114 filed Jun. 29, 2018 is a continuation-in-part of U.S. patent application Ser. No. 13/649,935 filed Oct. 11, 2012 which claims benefit of U.S. Provisional Application No. 61/546,412, filed Oct. 12, 2011.

TECHNICAL FIELD

The present disclosure pertains to a method and system for processing electronic payments from buyers to merchants, where an interchange rate is applied to the payment.

BACKGROUND

Electronic systems for handling various payments between government, corporate, or institutional (i.e., non-consumer) customers (also referred to herein as "buyers"), and their merchants, suppliers, vendors and other payees (all of whom may sometimes be referred to as "merchants"), face challenges. For example, mechanisms are lacking for processing payments made via non-physical payment cards, i.e., payment card accounts lacking an actual physical plastic card. Non-physical payment cards may include a so-called "ghost card" as well as one-time use cards, often referred to as a "virtual card."

One present system requires a customer cardholder wishing to make a payment to its merchant, supplier or vendor (to the extent there is any difference between them, merchants, suppliers and vendors alike are referred to herein as merchants) to notify its issuing bank of its desire to do so. Notice may then be provided to the merchant, which must then enter card data, an amount of the payment, date of payment, invoice number(s), etc., to which the payment applies, and other payment-related data that may be required, into a point of sale terminal, processing software, or other card acceptance system that has been provided to the merchant by its merchant bank in order to submit card transactions for processing and ultimate funding. For a ghost card or a one-time use card, an e-mail notification may be sent to the merchant identifying invoices to be paid, the amount of each, and the overall payment amount to be applied to the card.

Further, present card payment mechanisms are fraught with security risks. For example, buyers are often exposed to fraud by merchants who, under present mechanisms, receive access to the buyer's cards data (account number, expiration date, etc.). Moreover, such security risks have engendered many and complex laws, rules, and regulations governing the security and compliance obligations to which card issuers and merchants must adhere. These laws, rules, and regulations cause transactions to be unduly difficult and expensive. In addition, the foregoing issues have slowed acceptance of use of payment cards for commercial transactions.

Thus, current processes are time-consuming, cumbersome, risky, and fraught with potential errors. Furthermore, in the likely event that the merchant participates in multiple virtual card and ghost card programs from multiple customers, the burden is amplified and further complicated by the fact that various virtual card programs have their own set of operational idiosyncrasies and logon credentials that must be managed by the merchant, and moreover ghost cards generally require the merchant to securely house the card information yet be able to quickly retrieve it to complete the payment instructions.

Additionally, present card payment mechanisms are subject to payment of an interchange fee by the merchant, to the card issuer. The interchange fee is determined by a fixed interchange rate, typically a few percentage points, which is applied to each card payment transaction. Some card payment mechanisms provide a rebate (also referred to herein as a buyer's discount or reimbursement) to the buyer, typically a percentage of the purchase price, paid to the buyer from the issuer. The interchange rate paid by the merchant, and the rebate paid to the buyer are each established by contractual agreements between the card issuers, buyers, and merchants, and remain fixed, regardless of what is being bought, the amount of the transaction, and/or the length of time taken by the buyer to pay for the transaction.

As such, merchants may be dissuaded from accepting card payments from buyers as compared with other forms of non-card payment, where using non-card payment mechanisms, various discounts can be offered by the merchant directly to the buyer based on the transaction volume (units or dollars), the type of goods or services being purchased, and/or as an early-pay discount. In contrast, card payment mechanisms which include fixed interchange rates represent a fixed cost to the merchant which is incurred even when an extended amount of time is taken by the buyer to pay for the transaction, is not reduced by transaction volume, and is not commodity specific. Any additional discounting offered by a merchant to the buyer is incremental to the merchant's card payment fixed costs. Further, even though the merchant could agree to accept a card payment method based on a buyer's promise to early pay card payment, the merchant has no means for enforcement of the buyer's promise, as the buyer receives the same rebate (discount), regardless of the length of time taken by the buyer to pay for the transaction, while the merchant is incurring a fixed rate of interchange fees without receiving the benefit of early payment from the buyer who does not comply with his promise of early payment.

SUMMARY

A method and system for processing a card payment received from a buyer is disclosed herein, which provides for the secure transmission of card data and payment information, including secure transmission of payment messages and settlement notifications throughout the payment system, provides convenience to the buyer and merchant in terms of buyer initiation of a payment using a payment message configured in a buyer specified format, automated payment processing including dynamic rate adjustments, and automated reporting to the merchant of a payment settlement in a notification message configured in a merchant specified format. Advantageously, the method and system described herein is configured to dynamically adjust the interchange rate paid by the merchant for the card payment transaction, based on one or more adjustment factors agreed upon by the issuer, merchant and buyer which can include, for example, the size and/or volume of the transaction, the type of goods and/or services being transacted, the timeliness of buyer's payment, measured for example, in days sales outstanding (DSO), etc., to incentivize the merchant to accept card payments from a buyer, for the buyer's convenience and security in accordance with the system and methods disclosed herein. The method and system described herein is further advantaged by being configured to dynamically determine an adjusted rebate rate or discount to the buyer, based on the adjustment factors and/or the dynamically adjusted interchange rate, thus providing a flexible system which is configured to allow the merchant to incentivize a buyer using a card payment mechanism for early payment, volume transactions, etc., based on terms agreed to by the card issuer, buyer and merchant.

A method for processing a payment message received from a buyer and including payment data for processing a payment on behalf of a merchant, the payment relating to a transaction between the buyer and the merchant is provided. The method includes receiving, via a computing device including a payment portal, an encrypted payment message from a buyer relating to a transaction with a merchant where the payment portal includes a plurality of parsing algorithms including a first parsing algorithm and at least a second parsing algorithm, and a plurality of interchange rate tables. The method includes parsing, in the computing device and using the first parsing algorithm, the encrypted payment message to obtain merchant identifying information where the merchant identifying information is associated in the payment portal with the second parsing algorithm. The method further includes parsing, in the computing device and using the second parsing algorithm, the encrypted payment message to obtain payment information defined by the transaction, and selecting, via the payment portal and using the merchant identifying information and the payment information, a selected interchange rate table from the plurality of interchange rate tables where the selected interchange rate table is associated in the payment portal with the merchant identifying information and the payment information. In one example, at least one of the merchant identifying information and the payment information includes an interchange adjustment factor defined by the transaction and the method further includes determining, in the computing device and using the selected interchange rate table and the interchange adjustment factor, an adjusted interchange rate.

In one example, the payment portal includes a plurality of settlement algorithms, and the method further includes selecting, via the payment portal and using the at least one of the merchant identifying information and the payment information, a selected settlement algorithm from the plurality of settlement algorithms where the selected settlement algorithm is associated in the payment portal with at least one of the merchant identifying information and the payment information, and determining, in the computing device and using the selected settlement algorithm, an adjusted interchange fee defined by the adjusted interchange rate and the payment information.

In one example, the payment portal includes a plurality of payment algorithms, and the method further includes selecting, via the payment portal and using the at least one of the merchant identifying information and the payment information, a selected payment algorithm from the plurality of payment algorithms where the selected payment algorithm is associated in the payment portal with at least one of the merchant identifying information and the payment information, and where the payment information includes a payment amount to be paid by the buyer to the seller. The method further includes compiling, via the payment portal and using at least one of the selected payment algorithm and the selected settlement algorithm, a settlement output, where the settlement output includes the payment amount and at least one of the adjusted interchange rate and the adjusted interchange fee.

In one example, the payment portal is in communication with at least one of a payment application provider and an issuer, and the method includes encrypting, in the computer device and using the payment algorithm, the settlement output, and transmitting, via the payment portal, a payment authorization request to the at least one of the payment application provider and the issuer, where the payment authorization request is associated in the payment portal with the settlement output. The method can include receiving, via the payment portal, a response to the payment authorization request where the response includes one of an approval and a declination of the payment authorization request, and in the event of a declination, reporting the declination of the payment authorization request, via the payment portal, to one of the buyer. In the event of an approval, the method can include selecting, via the payment portal and using the merchant identifying information and the payment information, a selected reporting algorithm from a plurality of reporting algorithms accessible via the payment portal, where the selected reporting algorithm is associated in the payment portal with the merchant identifying information and the payment information, and generating, in the computing device and using the selected reporting algorithm and at least one of the settlement output, the payment authorization request, the merchant identifying information, and the payment information, a merchant notification message including a notification of the approval of the payment authorization request. The merchant notification message can include one of the payment amount, the adjusted interchange rate, and the adjusted interchange fee. The method can further include transmitting, via the payment portal, the merchant notification message to the merchant.

In one example, the method includes determining, via the payment portal and using at least one of the adjustment factor and the adjusted interchange rate, a buyer rebate. The payment portal can includes a plurality of rebate tables, and the method can further include selecting, via the payment portal and using the merchant identifying information and the payment information, a selected rebate table from the plurality of rebate tables where the selected rebate table is associated in the payment portal with the payment information, and determining, in the computing device and using the rebate table and at least one of the adjustment factor, the adjusted interchange rate, and the settlement algorithm, an adjusted rebate rate. The payment portal can include a plurality of reporting algorithms such that in the present example, the method can include selecting, via the payment portal and using the merchant identifying information and the payment information, a selected reporting algorithm from the plurality of reporting algorithms where the selected reporting algorithm is associated in the payment portal with the payment information, and reporting, via the payment portal, the adjusted rebate rate to at least one of the payment application provider and the issuer.

In one example, the transaction can include a plurality of transactions including a first transaction and at least a second transaction, which by way of illustrative example can be included in the payment message, respectively, as payment information related to a first invoice and payment information related to a second invoice. In the present example, the interchange adjustment factor can include a plurality of interchange adjustment factor including a first interchange adjustment factor associated by the payment information with the first transaction and at least a second interchange adjustment factor associated by the payment information with the second transaction. The method can further include determining, in the computing device and using the selected interchange rate table and the first interchange adjustment factor, a first adjusted interchange rate for the first transaction, and determining, in the computing device and using the selected interchange rate table and the second interchange adjustment factor, a second adjusted interchange rate for the second transaction. The method can further include comparing, in the computing device and using at least one of the settlement algorithm and the payment algorithm, the first adjusted interchange rate and the second adjusted interchange rate, and where the first adjusted interchange rate and the second adjusted interchange rate are different rates, adjudicating, in the computing device and using the settlement algorithm, the first adjusted interchange rate and the second adjusted interchange rate to determine an adjudicated interchange rate, where the adjudicated interchange rate can be used as the adjusted interchange rate for the transaction. In one example, adjudicating the first and second adjusted interchange rates can include determining a weighted average of these rates, and deriving the adjudicated interchange rate using the weighted average or other weighting factors such as the days sales outstanding, the payment amount, and/or the commodity, market, product or service segment associated with each of the first and second transactions.

In one example, the plurality of parsing algorithms includes a third parsing algorithm and the method includes parsing, in the computing device and using the third parsing algorithm, the encrypted payment message to obtain the interchange adjustment factor, and/or to obtain at least one of days sales outstanding (DSO) for the transaction and a payment amount for the transaction, where in the present example the interchange adjustment factor can be defined by at least one of the days sales outstanding (DSO) and the payment amount.

In one example, at least one of the merchant identifying information and the payment information includes an indication of at least one of a commodity, a market segment, a product segment, and a service segment associated with the transaction, and the plurality of interchange rate tables includes at least one interchange rate table associated with the at least one of a commodity, a market segment, a product segment, and a service segment associated with the transaction. In the present example, the method can include, selecting a selected interchange rate table which is associated in the payment portal with the at least one of the commodity, the market segment, the product segment, and the service segment.

An apparatus including a computing device having a processor and a memory is provided. The memory of the apparatus stores instructions executable by the processor, including a plurality of parsing algorithms, a plurality of reporting algorithms, a plurality of payment algorithms, a plurality of settlement algorithms, a plurality of merchant profile tables, a plurality of transaction reference tables, and a plurality of rate tables including at least one interchange rate table, such that the apparatus is configured to execute the method for processing a payment message received from a buyer and including payment data for processing a payment on behalf of a merchant, the payment relating to a transaction between the buyer and the merchant, where the method includes dynamically determining an adjusted interchange rate to be applied to the payment in real time, as described herein.

The above noted and other features and advantages of the present disclosure are readily apparent from the following detailed description when taken in connection with the accompanying drawings.

BRIEF DESCRIPTION OF THE DRAWINGS

FIG. 6 illustrates an example of payment confirmation data in the form of an email to a merchant.

FIG. 10 illustrates an example of a settlement output generated by the process illustrated in FIGS. 7 and 8.

FIG. 13 illustrates another example of a payment settlement notification to a merchant.

DETAILED DESCRIPTION

Introduction

Figure 1:
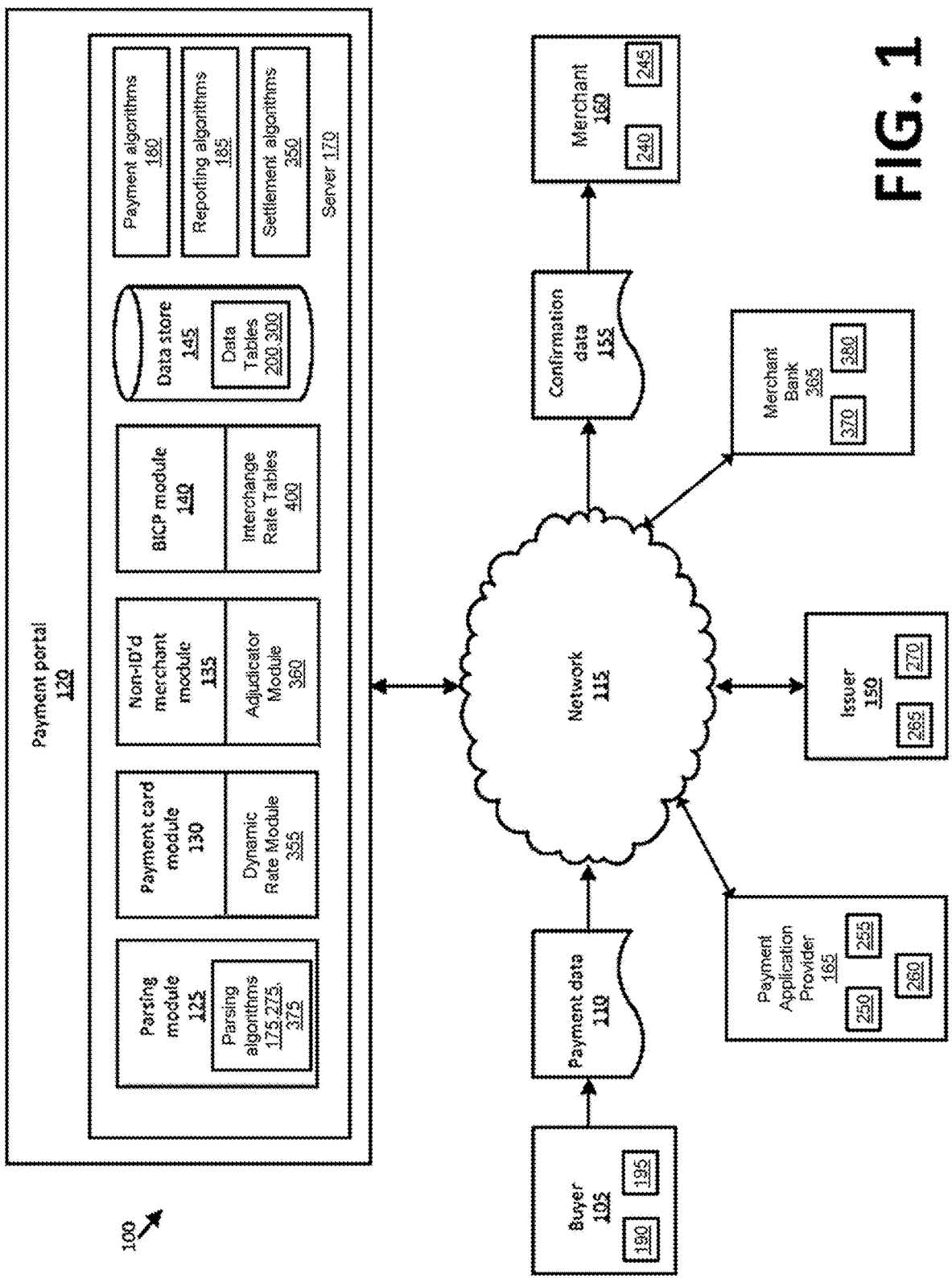
FIG. 1 is a block diagram of a system for processing payment card transactions.

A system 100 and method 700 for processing a card payment received from a buyer 105 is disclosed herein, which provides for the secure transmission of card data 345 and payment information 110, including secure transmission of payment messages 500 and settlement notifications 600 throughout the payment system 100, provides convenience to the buyer 105 and merchant 160 in terms of buyer initiation of a payment using a payment message 500 configured in a buyer specified format, automated payment processing including dynamic adjustments of interchange rates and/or rebate rates, and automated reporting to the merchant 160 of a payment settlement in a notification message 600 configured in a merchant specified format. Advantageously, the system 100 and method 700 described herein is configured to dynamically adjust the interchange rate used to calculate the interchange fee paid by the merchant for the card payment transaction, based on one or more adjustment factors 485 agreed upon by the issuer 150, merchant 160 and buyer 105 which can include, for example, the dollar size 455 and/or volume of the transaction, the type of goods and/or services being transacted, the timeliness of buyer's payment, measured for example, in days sales outstanding (DSO) 450, etc., to incentivize the merchant 160 to accept card payments from the buyer 105, providing a benefit to the buyer in payment convenience and security in accordance with the system and methods disclosed herein. The method 700 and system 100 described herein is further advantaged by being configured to dynamically determine an adjusted rebate rate used to calculate a rebate or discount to the buyer 105, based on the adjustment factors and/or the dynamically adjusted interchange rate applied to the payment, thus providing a flexible system which enables the merchant 160 to incentivize a buyer 105 who is using a card payment mechanism to pay early, purchase in volume, etc., based on terms agreed to by the card issuer 150, buyer 105 and merchant 160.

Disclosed herein are certain systems, apparatuses, and methods, including methods and processes which may be embodied as algorithms 175, 275, 350, 375 and/or instructions stored on a computer-readable medium and executable by a processor. For example, mechanisms may be used to receive transaction-related data 110, 345, 485 sent by a payment card issuer ("issuer") or a third party serving as issuer's and/or payer's proxy, to a merchant via secure file transfer, secure e-mail, or secure facsimile. Alternatively, or additionally, mechanisms may be used to retrieve transaction-related data 110, 345, 485 from one or more issuer websites/portals and/or via an internet protocol IP connection or the like with such issuers 150 on behalf of one or more merchants 160. Then, usernames, passwords and other security features embedded in such messages may be extracted, whereupon a logon to an issuer's virtual card website/portal may be performed. Secure card data intended for the merchant 160 and related to the payment transaction may then be accessed. The issuer 150 or buyer 105 may opt to provide payment instructions via a direct secure connection to expedite the delivery of payment transaction process.

Once transaction data is accessed, card data may be associated with the merchant's unique merchant ID ("MID") 285 and invoice information 340 to which the payment applies. After the card data 345, MID 285 and invoice information 340 are associated, or matched, payment may be processed on behalf of the merchant 160 that has provided authorization to facilitate its transactions, thereby eliminating the need for the merchant 160 to access payment transaction data 110 and process the transaction at the direction of its customer 105 itself. In one example, a dynamic rate module 355 applies an adjustment factor parsing algorithm 375 to the transaction data 110 to determine one or more interchange adjustment factors 485 defined by the transaction data 110. The dynamic rate module 355 selects an interchange rate table 400 which is associated with the MID 285 in the data store 145. The interchange rate table 400 includes a plurality of interchange rates 425, each of which is associated with at least one interchange adjustment factor 485 as agreed between the merchant 160 associated with the MID 285, the buyer 105, and the issuer 150. The dynamic rate module 355 applies the settlement algorithm 350 to selects, using the interchange adjustment factors 485 identified from the transaction data 110, an interchange rate 425 from the selected interchange rate table 400 and applies the selected interchange rate 425 to the transaction, where the selected interchange rate 425 is referred to herein as an adjusted interchange rate 425. In one example, where the payment transaction data 110 includes multiple transactions and/or invoices, where at least one of the transactions and/or invoices includes one or more adjustment factors 485 determining a first adjusted interchange rate 425, and another of the transaction and/or invoice included in the payment transaction data 110 includes one or more of the adjustment factors 485 that determine a second adjusted interchange rate 425 which is different from the first adjusted interchange rate 425, an adjudicator module 360 adjudicates the interchange rates 425 applied to the collective transactions and/or invoices to determine a composite adjusted interchange rate 425 applied to the payment transaction. In one example, the composite adjusted interchange rate 425 can be determined using a weighted average of the collective payments and/or adjustment factors and assign a composite adjusted interchange rate 425 to the transaction which is the adjusted interchange rate 425 associated with the weighted average and/or averaged adjustment factors. The adjudicator module 360 and/or settlement algorithms 350 can include additional adjudication methods which are defined, for example, by an agreement between the issuing bank 150, the buyer 105, and the merchant (supplier) 160 associated with that payment transaction.

Upon the authorization and settlement of a transaction, e.g., upon the payment portal 120 receiving an approval of the payment authorization request, a merchant 160 may be notified via one or more notification mechanisms 600, including e-mail, facsimile, or an IP connection, that the transaction has been completed and that the funds will be deposited into the merchant's designated depository account in the merchant's bank 365. The original buyer message 500 initiates a payment portal 120 to execute the payment process 700 described herein to process the payment transaction, which can include dynamically determining an adjusted interchange rate 425 using an interchange rate table 400 accessible by the payment portal 120 and applying the adjusted interchange rate 425 to the payment in real time, compiling a settlement output 440 and processing this through a payment provider 165 and issuer 150, and generating the notification 600 to the merchant that the payment transaction has been completed. An accounting of the settlement including the adjusted interchange fee 465 determined using the adjusted interchanged rate 425, is provided to the merchant, which in one example, is configured as an associated transaction report 460.

In some cases, the payment authorization request can be declined. In this event, upon receiving a declination of the payment authorization request, the payment portal 120 can be configured, for example, using the parsing module 125, to obtain a reason code and descriptor from the declination report, which can be provided to the issuer 150 or customer/buyer 105, for example, using a reporting algorithm 185, so that the merchant 160 does not have to deal with buyer 105 and/or the issuer 150 when a buyer-directed payment is declined.

To facilitate the foregoing mechanisms, a merchant 160 generally will provide necessary permissions and proxies giving authorization to the payment portal 120 to receive card data 345 and process such transactions on behalf of the merchant 160 and will generally provide instructions (e.g., via a specially assigned email address) to the ghost/virtual card issuing bank 150 to redirect (or send a copy of) all ghost/virtual card-related messages scheduled to be delivered to the merchant via a specified mechanism such as the specially assigned e-mail address. Certain issuers 150 may have the capability to transmit such messages directly via a secure IP connection in lieu of an e-mail/facsimile. An issuer 150 can be referred to herein as the buyer's issuer, the card issuer, an issuing bank, and/or as the buyer's issuing bank.

In general, during the payment process 700 described herein, card data 345 is not exposed to the merchant 160 at any time, and as such, Payment Card Industry Data Security Standard (PCI DSS) compliance is maintained. Thus, the presently disclosed mechanisms advantageously create a secure environment in which the risk of merchant fraud is greatly reduced. Further, because the merchant 160 never accesses card data 345, the merchant 160 is advantageously relieved of obligations to adhere to various security requirements, such as PCI requirements.

In short, the present disclosure includes mechanisms by which a buyer-initiated one time use or ghost transaction card payment may be processed on behalf of a merchant 160 by a payment portal 120, using the process 700 described herein. That is, a transaction may be proxied, or emulated, on behalf of a merchant 160 in a manner that yields the same result for a merchant 160 as a transaction in which the buyer (i.e., customer) 105 initiates a transaction directly to the merchant (i.e., supplier) 160, but with significant efficiencies for the merchant 160 and greatly reduced risk for all parties (e.g., the card issuer 150, the buyer 105, and the merchant 160), and with the additional advantage that an adjusted interchange rate 425 determined pursuant to an adjustable interchange rate table 400 can be applied in real time to the payment transaction thus providing a means to dynamically discount the transaction and/or to dynamically adjust the buyer's rebate according to terms agreed upon by the card issuer 150, the buyer 105 and the merchant 160.

System Overview

Figure 7:
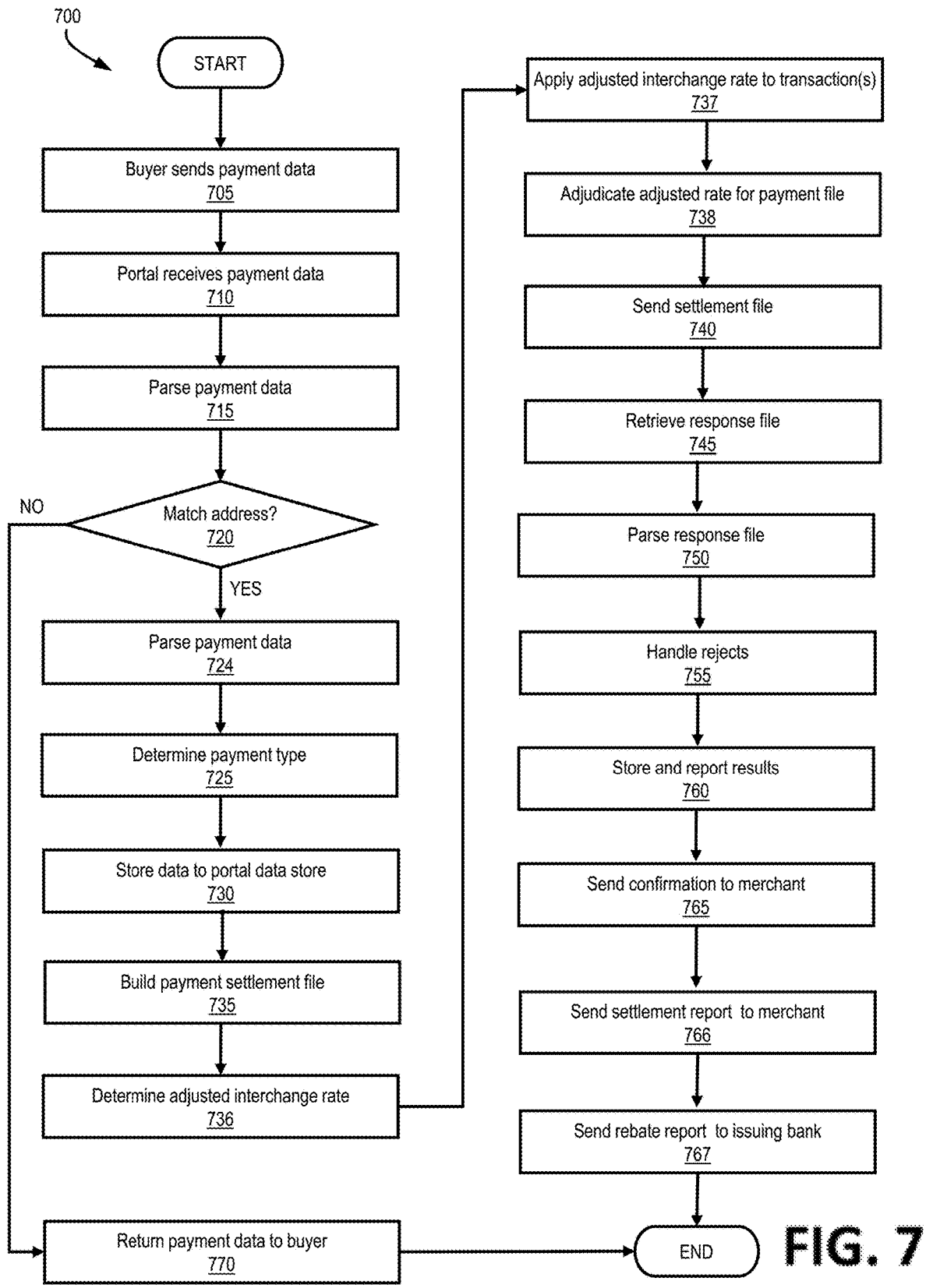
FIG. 7 illustrates an exemplary process for processing a card payment on behalf of the merchant.
Figure 8:
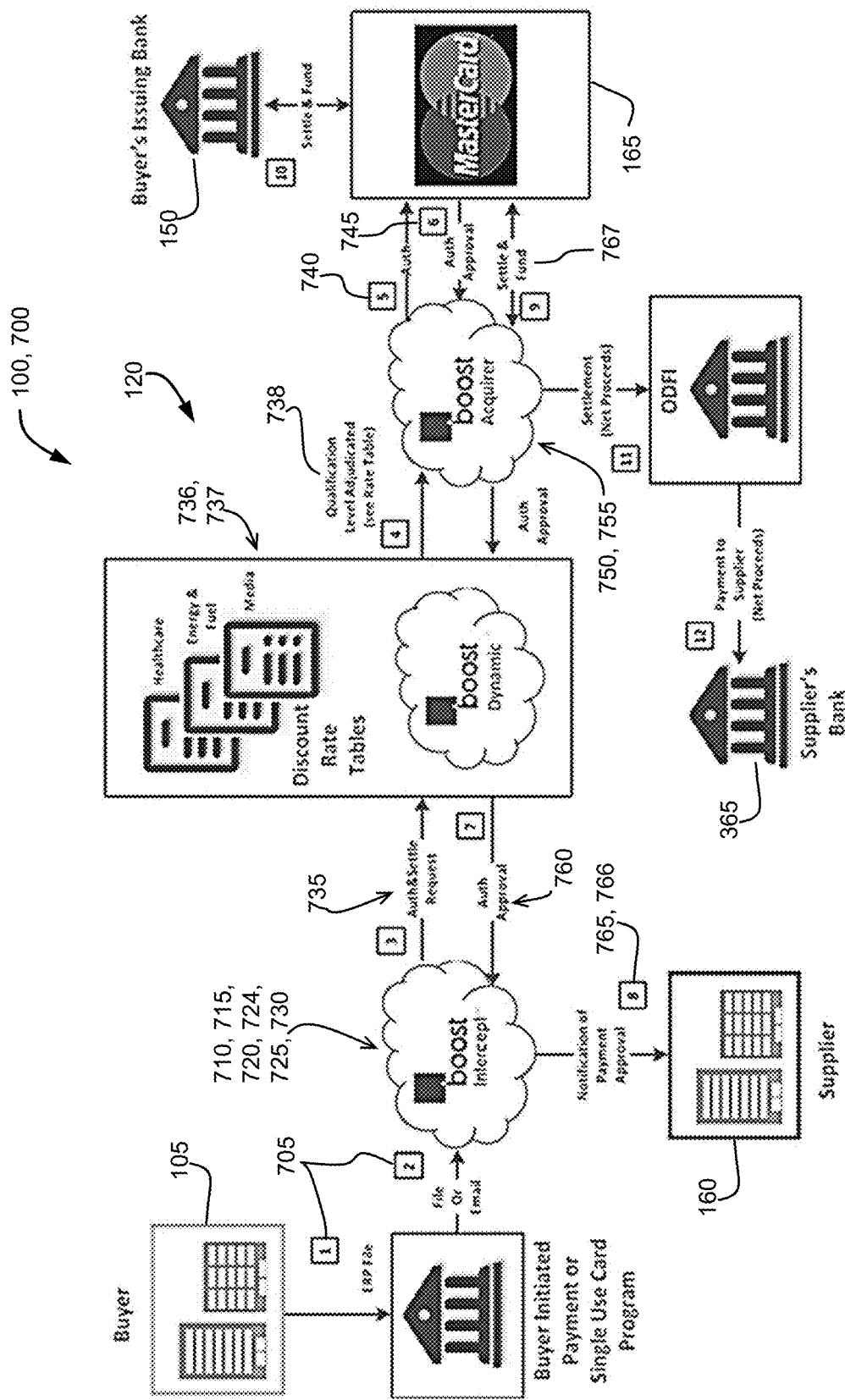
FIG. 8 illustrates the exemplary process of FIG. 7 as applied to the system of FIG. 1, for processing a card payment on behalf of the merchant.

As illustrated by the method 700 shown in FIG. 7 and illustrated in FIG. 8, FIG. 1 is a block diagram of a system 100 for processing payment card transactions via a payment portal 120. A buyer 105 transmits sends a payment message 500 that includes payment data 110, e.g., via a network 115, to the payment portal 120. The payment message 500, as illustrated by the non-limiting example payment messages 500A, 500B, 500C shown respectively in FIGS. 4, 5 and 9, includes a merchant identifier, such as the name of a merchant 160 to which the payment is directed, a merchant ID (MID) 285 assigned to the merchant 160, and/or a destination email address which includes a merchant assigned email 235. Various modules such as a parsing module 125, a card payment module 130, a non-identified merchant module 135, a buyer-initiated card payment (BICP) module 140, a dynamic rate module 355, an adjudicator module 360, etc., may be included in the portal 120, which may also include a data store 145. The different modules 125, 130, 135, 140, 355, 360 may process different kinds of data and/or transactions using algorithms and/or instructions which may be stored within the different modules 125, 130, 135, 140 355, 360 and/or in the data store 145 and/or in one or more servers 170 hosting the payment portal 120. In one example, the parsing module 125 includes a plurality of parsing algorithms 175, 275, 375 including at least one identifying parsing algorithm 175 for parsing the payment message 500 to obtain the merchant identifying information such as the merchant ID 285 and/or the assigned merchant email 235 and/or to obtain buyer identifying information such as a buyer email 335 and/or the name of the buyer 105, further including a plurality of information parsing algorithms 275 for parsing various formats of payment messages 500 which are received by the payment portal 120 to obtain payment data 110, and further including a plurality of adjustment factor parsing algorithms 375 for parsing the payment message 500 and/or payment data 110 to obtain adjustment factors 485 for determining an adjusted interchange rate 425, as described in further detail herein.

In one example, the payment portal 120 includes a plurality of payment algorithms 180 for processing the various types of payments as directed by the buyer 105 via the payment message 500, as described in further detail herein. In one example, the payment algorithm 180 can be configured to encrypt payment information and/or a settlement output 440 prior to submission to a payment application provider 165, and/or submit payment information and/or a settlement output 440 to a payment application provider 165, such as a third party processor, on behalf of the merchant 160. For example, the payment portal 120 can include a payment algorithm 180 for processing a buyer-initiated card payment (BICP) transaction, another payment algorithm 180 for processing a ghost card payment, another payment algorithm 180 for processing a single use card payment, another payment algorithm 180 for processing a gateway payment, another payment algorithm 180 for processing a third party processor payment, another payment algorithm 180 for processing a tokenized payment, etc. The examples are non-limiting, and it would be understood that the payment portal 120 can include a payment algorithm 180 for at least each type of payment application 290 for which a merchant 160 is registered, e.g., for each type of payment application 290 shown in a merchant profile table 200.

In one example, the payment portal 120 includes a plurality of settlement algorithms 350 for processing payments to which an adjusted interchange rate 425 is applied. In one example, the settlement algorithm 350 is configured to select an adjustable interchange rate table 400 from a plurality of rate tables 400 stored within the data store 145 or otherwise accessible by the payment portal 120, where the adjustable interchange rate table 400 selected by the settlement algorithm 350 for a payment transaction is associated in the data store 145, for example, via a transaction table 300, with the buyer 105 and merchant 160 identified in the payment transaction, and to apply one or more adjustment factors 485 parsed from the payment message 500 to the adjustable interchange rate table 400 to determine an adjusted interchange rate 425 to be applied to the payment. The settlement algorithm 350, in one example, applies the adjusted interchange rate 425 to the payment to determine an adjusted interchange fee 465 to be paid from the payment proceeds to the issuer 150, as further described herein. In one example, an adjudicator module 360 applies at least one settlement algorithm 350 to payment information including multiple transactions and/or invoices, to determine an adjudicated interchange fee from various adjusted interchange rates 425 applicable to various transactions and/or invoices included in the payment information, where at least one of the transactions and/or invoices has adjustment factors 485 which are different from another transaction and/or invoice included in the payment message 500, for example, where the days sales outstanding (DSO) of one invoice differs significantly from the DSO of another invoice. In one example, the settlement algorithm 350 and/or the dynamic rate module 355 can determine an adjusted buyer rebate to be reported to the issuer 150, as determined by a rebate table 400 associated with the issuer 150 and buyer 105 associated with the payment being transacted.

The payment algorithms 180 and settlement algorithms 350 can be stored in the payment portal 120 such that the payment algorithms 180 and settlement algorithms 350 are accessible by one or more of the modules 125, 130, 135, 140, 355 and 360. In one example, the payment algorithms 180 and/or the settlement algorithms are stored in the portal data store 145. Information obtained from the payment data 110 during parsing of a payment message 500 by an identifying parsing algorithm 175 and/or an information parsing algorithm 275 can be used by the payment portal 120 to select the one of the plurality of payment algorithms 180 and the one of the plurality of settlement algorithms 350 corresponding to the payment data 110, such that the selected corresponding payment algorithm 180 and settlement algorithm 350 can be used to process the payment authorized by the payment message 500. The payment data 110 may be formatted for transmission to an issuer 150 and/or a payment application provider 165 in the payment message 500.

In a process described herein, the buyer 105, by agreement with the merchant 160 and/or the buyer's issuing bank 150, transmits the payment message 500 to the payment portal 120 rather than sending the payment message 500 directly to any one of the merchant 160, the issuer 150, or to a payment application provider 165, such that the payment message 500 is intercepted by the payment portal 120 for processing of the payment data 110 in one or more of the modules 125, 130, 135, 140, 355, 360, where processing the payment data 110 can include submission of payment information and, when an adjusted interchange rate is applied, a settlement output 440, to the issuer 150 and/or to a third party settlement processor 165 on behalf of the merchant 160, and confirmation of payment completion, whereupon the portal 120 sends confirmation and settlement data 155 and associated transaction data 460 to a merchant 160 in a reporting format 600 which is specified by the merchant 160. As such, the system and process described herein provides an advantage to the merchant 160 receiving payments from multiple buyers 105, which may be submitted in a variety of differing payment formats, by using the payment portal 120 to electronically decrypt, parse and/or process the various payment messages 500 from the multiple buyers 105, rather than employing staff and other resources which would be required for the merchant 160 to manually perform the payment processing. Another advantage of the system 100 and process 700 described herein is the generation of a payment confirmation file and/or notification email 600 which is provided for each payment processed to the merchant 160 in a format which is specified for the merchant 160. By way of example, the payment information included in the payment confirmation file and/or notification email 600 can be formatted for downloading and/or direct input into the merchant 160 accounting system, improving the efficiency and accuracy of payment receipt reporting in the merchant 160 accounting system. In one example, the payment information included in the payment confirmation file and/or notification email 600 can include an associated transaction report 460, illustrated in a non-limiting example shown in FIG. 11, which can be provided for each payment processed to the merchant to report settlement of the fees paid from the total transaction amount during the payment processing, including, in the example shown, an adjusted interchange fee 465 paid from the merchant's total payment amount to the issuer 150, an acquirer fee 430 paid from the merchant's total payment amount to the acquirer/payment application provider 165, and a net amount to be deposited to the merchant's designated account in the merchant's bank 365. By way of example, the payment and fee settlement information included in the payment confirmation file, notification email 600, and/or associated transaction report 460 can be formatted for downloading and/or direct input into the merchant 160 accounting system, improving the efficiency and accuracy of payment receipt reporting in the merchant 160 accounting system, including efficiency and accuracy in reporting of the associated settlement fees such as the adjusted interchange fee 465 paid by merchant, thus providing a reporting mechanism to determine and account for the discount effectively provided to the buyer 105 for each payment related to the adjusted interchange fee 465 determined for that payment.

Referring again to FIGS. 1 and 8, the buyer 105 is generally a purchaser of goods and/or services from the merchant 160. The buyer 105 generally includes one or more computing devices, which can include a buyer server 195 having computer-executable algorithms and/or instructions for formatting and sending payment data 110 as well as for performing other operations disclosed herein. As shown in FIG. 1, the buyer 105 is in communication with a network 115. In one example, the buyer is in communication with the network 115 via a communication interface such as a buyer website 190.

The buyer 105 provides the payment data 110 in an electronic format, generally as a message 500 that may be referred to as a "payment message," such as in an email (see examples shown in FIGS. 5 and 6), on a webpage, in an Extensible Markup Language (XML) file format, a comma separated values (CSV) file format, an XML interchange format for common language (XCL), an ACH payment format, and so on, or according to some other electronic format. In one example, the payment message 500 can be sent from the buyer 105 directly to the payment portal 120, as illustrated by the example email message 500B shown in FIG. 5. In another example shown in FIG. 6, the buyer 105 can direct an issuer 150 and/or a payment application provider 165, as a proxy for the buyer 105, to send the payment message 500 to the payment portal 120, as illustrated by the example proxy email message 500A shown in FIG. 4. The payment message 500 and/or the payment data 110 in the payment message can be secured, for example, by encryption. The payment data 110 included in the payment message 500 includes information relating to the buyer 105, and generally further identifies one or more merchants 160 and one or more payments to be made to the one or more merchants 160. For example, payment data 110 may include a buyer identifier indicating a buyer 105, payment card data 345, invoice information 340 relating to one or more invoices, such as invoice amount(s), an invoice date, an invoice identifying number, an indicator concerning whether a card is a debit card or credit card, etc.

Figure 4:
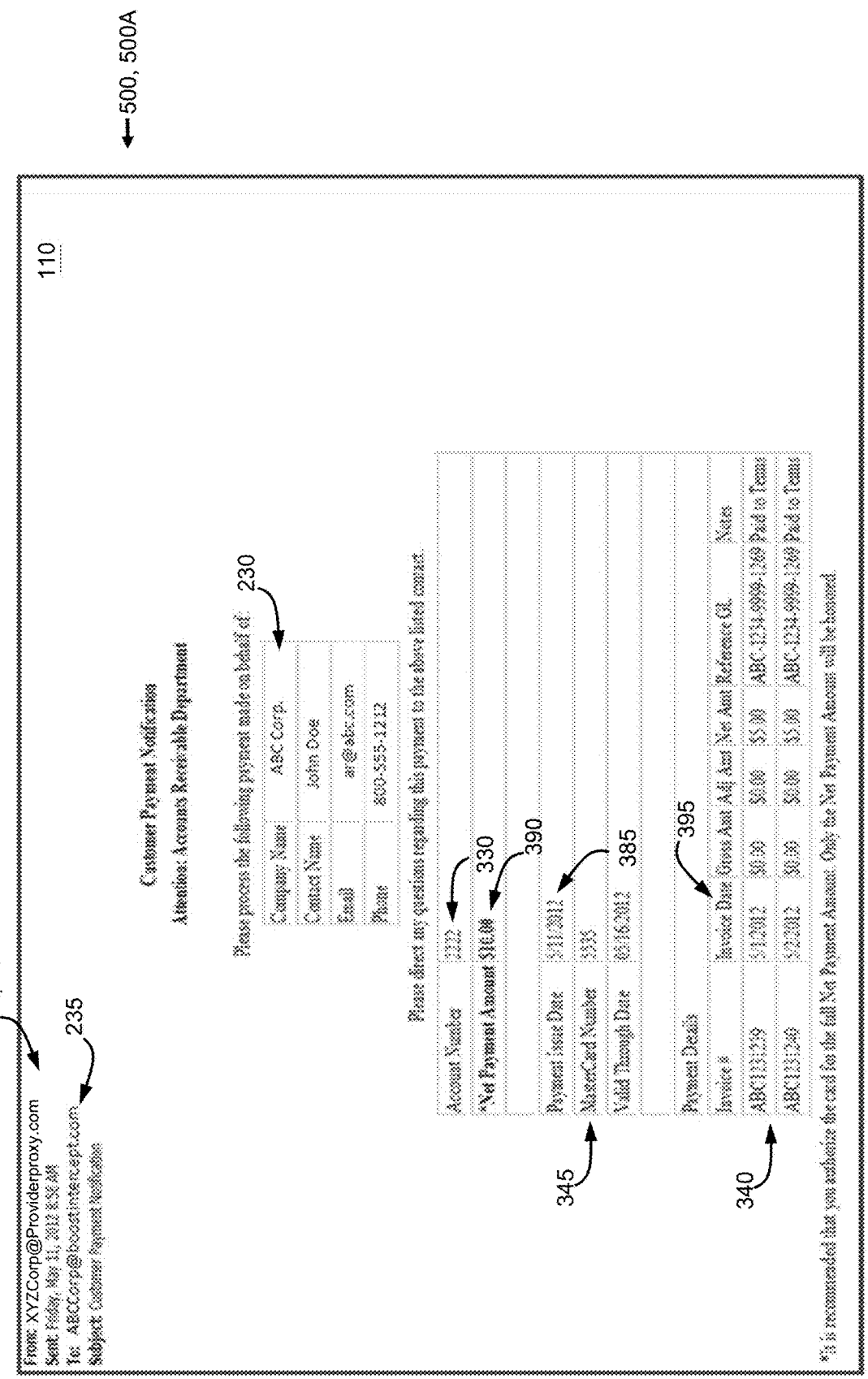
FIG. 4 illustrates an example of payment data in the form of an email where the mode of payment is via a ghost card.
Figure 5:
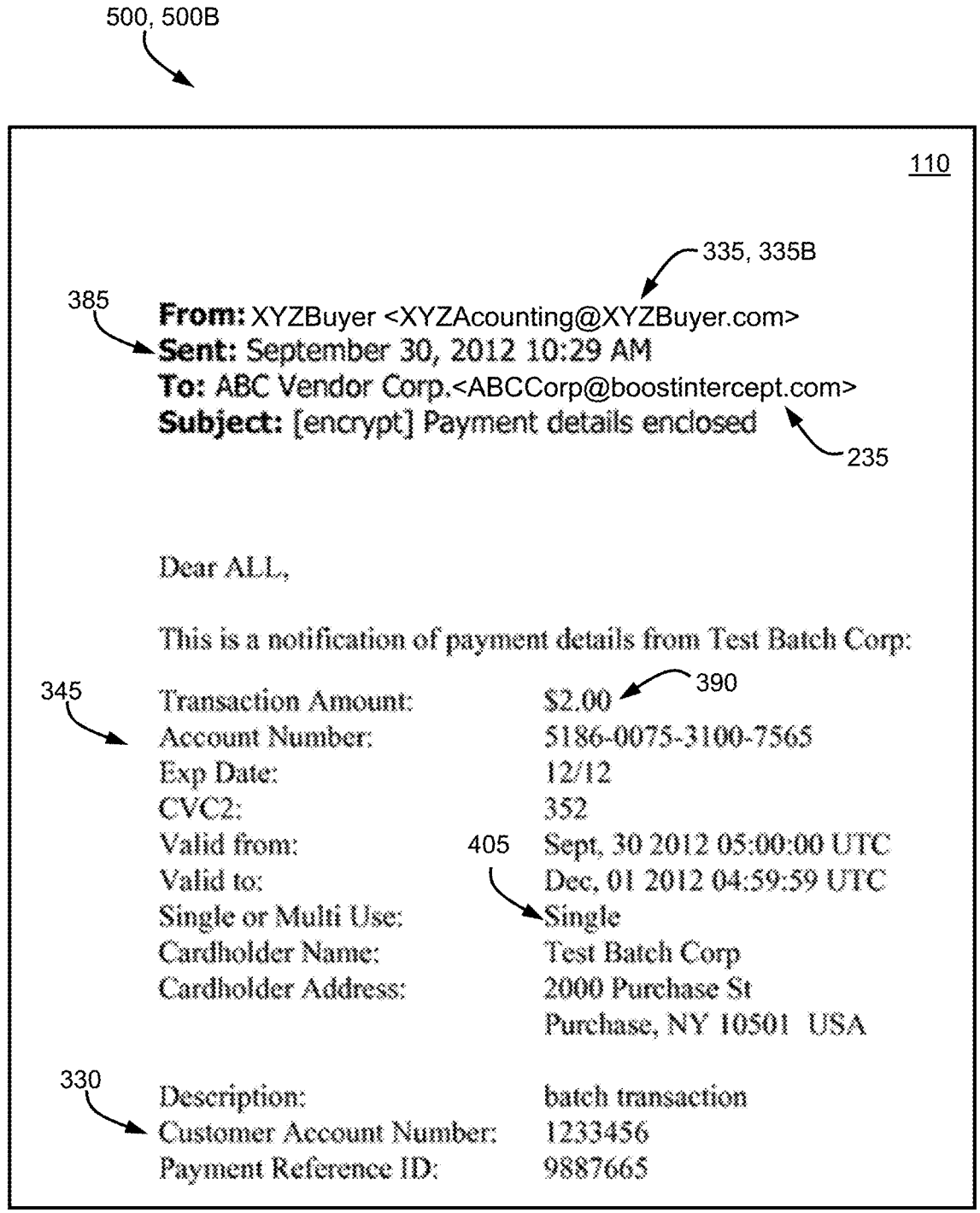
FIG. 5 illustrates an example of payment data in the form of an email where the mode of payment is via a virtual card.

In the examples shown in FIGS. 4 and 5, the sender email address is a buyer email 335 which provides buyer identifying information by which the buyer 105 initiating the payment transaction can be identified, and the destination email address is a merchant email address 235 which has been assigned by the payment portal 120 to the merchant 160 who is the intended recipient of the payment initiated by the buyer 105. The merchant email address 235 which has been assigned by the payment portal 120 to the merchant 160 by the payment portal may also be referred to herein as a merchant assigned email 235.

The buyer identifying information associated with each buyer 105 submitting a payment transaction for processing to the payment portal 120 is stored in the payment portal 120, for example, in the data store 145, and is associated in the data store 145 in a buyer profile table (not shown in figures) with the other information obtained from the buyer 105, for example, during registration of the buyer 105 to the payment portal 120. The data associated with each buyer 105 and stored in the data store 145 can include, by way of non-limiting example, the name of the buyer 105, one or more buyer email addresses 335 registered by the buyer 105 for use in submitting payment data 110 to the payment portal 120, other contact information for the buyer 105 including, for example, a street address, telephone number, the name of a buyer contact person, payment data 110 including, for example, a payment source type such as a payment application provider 165 and/or issuer 150 through which the payment by the buyer 105 will be transacted, and/or data specifying the format in which the payment data 110 will be received from the buyer 105. In a non-limiting example, the general contact information for the merchant 160 and/or the buyer 105, for example, the street address, telephone number, name of a buyer contact person, etc. may be stored in a remote data base and/or data management system (not shown in the figures) which is not included in the payment portal 120, and accessed and/or retrieved by the payment portal 120 from the remote data base as required. In an illustrative example, the remote data base and/or data management system can be a client relationship management (CRM) system such as SALESFORCE® or the like, which may be accessed, for example, through the network 115.

Each of the buyer email addresses 335 registered by the buyer 105 can be associated in the data store 145 with a specific payment source type and/or a specific format in which the payment data 110 will be presented in the payment message 500 received from that buyer email address 335, and further associated with a specific information parsing algorithm 275 for parsing the specific format in which the payment data 110 is presented in the payment message 500 from that buyer email address 335. Further, each of the buyer email addresses 335 registered by the buyer 105 can be associated in the data store 145 with more than one specific payment source types and/or more than one specific formats in which the payment data 110 will be presented in the payment message 500 received from that buyer email address 335. For each one of the specific payment source types and/or for each one of the specific formats registered by the buyer 105, an information parsing algorithm 275 for parsing the specific format in which the payment data 110 is presented in the payment message 500 from the that buyer email address 335 can be selected from a plurality of information parsing algorithms 275 included in the parsing module 125 and associated in the data store 145 and/or in the buyer profile table with the buyer email address 335 and the respective one of the specific payment source types and/or specific formats registered by the buyer 105. For each one of the specific payment source types and/or for each one of the specific formats registered by the buyer 105 as a payment source type to which an adjusted interchange rate 425 is to be applied, an adjustment factor parsing algorithm 375 for parsing the payment data 110 can be selected from a plurality of adjustment factor parsing algorithms 375 including in the parsing module 125 and associated in the data store 145 and/or in the buyer profile table with the specific payment source registered by the buyer 105. For each one of the specific payment source types to which an adjusted interchange rate 425 is to be applied, an adjustable interchange rate table 400 can be selected from a plurality of adjustable interchange rate tables 400 included in the data store 145 and/or accessible by the payment portal 120, where the selected adjustable interchange rate table 400 is associated with the buyer 105 and the specific payment source, and can be used, for example, in combination with one or more of the dynamic rate module 355, the adjudicator module 360, and at least one settlement algorithm 350 to determine an adjusted interchange rate 425 and adjusted interchange fee 465 for each payment processed for the specific payment source, which can be reported by the payment portal 120 to the merchant 160 associated with the buyer 105 and that specific buyer payment source. In one example, for each one of the specific payment source types to which an adjusted interchange rate 425 is to be applied, an adjustable rebate rate table 400 can be selected from a plurality of adjustable rebate rate tables 400 included in the data store 145 and/or accessible by the payment portal 120, where the selected adjustable rebate rate table 400 is associated with the buyer 105 and the specific payment source, and can be used, for example, in conjunction with one or more of a reporting algorithm 185, a settlement algorithm 350, the dynamic rate module 355, and/or the adjudicator module 360 to determine a buyer rebate for each payment processed for the specific payment source, which can be reported by the payment portal 120 to the buyer's issuer 105 associated with the specific payment source. The buyer profile information can be stored in the data store 145 such that the merchant profile table 200 and the data stored therein is accessible by each of the modules 125, 130, 135, 140, 355 and 360 in the payment portal 120.

The merchant identifying information associated with each merchant 160 receiving payments processed via the payment portal 120 is stored in the payment portal 120, for example, in the data store 145, and is associated in the data store 145 with the other information obtained from the merchant 160, for example, during registration of the merchant 160 to the payment portal 120. In an illustrative example shown in FIG. 2, the merchant identifying information is stored in a merchant profile table 200, which may be stored in the data store 145 such that the merchant profile table 200 and the data stored therein is accessible by each of the modules 125, 130, 135, 140, 355 and 360 in the payment portal 120. The data associated with each merchant 160 and stored in the data store 145 and/or the merchant profile table 200 can include, by way of non-limiting example, the name of the merchant 160, the merchant assigned email address 235 which is used as the destination address in payment messages 500 received by the payment portal 120 instructing payment to the merchant 160, other contact information for the merchant 160 including, for example, a street address, telephone number, the name of a merchant contact person, forwarding emails 280 for forwarding of payment reports and/or notification emails to the merchant 160 and/or to an administrator of the payment portal, depository account information for the merchant bank 365 and the merchant account into which the net settlement funds received from the payment transaction are to be deposited, payment data 110 including, for example, one or more payment applications 290 through which the payment by buyers 105 to the merchant 160 will be accepted for deposit into the merchant's depository account, data specifying for each payment application 290 whether an adjusted interchange rate 425 is to be applied, and/or data specifying the format and/or one or more reporting algorithms 185 to be used to generate reports which are sent to the merchant 160, including for example, payment confirmation reports, associated transaction reports 460, and/or notification messages 600.

The one or more reporting algorithms 185 associated with the merchant profile information 200 can be selected by the merchant 160 from a plurality of reporting algorithms 185 included in the payment portal 120, such that the payment data 110, invoice information 340, settlement and transaction data 460, and/or payment confirmation information included in the payment confirmation reports and/or notification messages 600 is in a format which is acceptable to the merchant 160. The process and system described herein is advantaged by associating a reporting algorithm 185 with a merchant 160, such that the merchant 160 can receive payment notification information in a format specified by the merchant 160 which preferably permits importation or transfer of the payment notification information into the merchant's accounting system with minimal or negligible manipulation, and in a format that invoice and payment information is easily matched in the merchant's accounting system to reconcile the buyer's account. By way of example, a reporting algorithm 185 can be configured to generate a payment confirmation report 600 in the format shown in FIG. 6, as a notification message including tabular data showing the invoice information 340 for the invoices and invoice amounts corresponding to the total payment amount made by the buyer 105. The reporting algorithm 185 can be configured to generate an associated transaction report 460 indicating the settlement details of the payment including the adjusted interchange fee 465, other fees such as the acquirer fee 430, and the net payment amount deposited to the merchant's account. By way of example, other reporting algorithms 185 can be configured to generate the payment confirmation report 600 and/or associated transaction report 460 in a format that can be automatically uploaded into the accounts receivable application of the merchant 160. For example, a reporting algorithm 185 can be configured to generate a payment confirmation report 600 in an EDI format, another reporting algorithm 185 can be configured to generate a payment confirmation report 600 in Bank Administration Institute (BAI) file format, another reporting algorithm 185 can be configured to generate a payment confirmation report 600 in another of an industry format such as, by way of non-limiting example, an Extensible Markup Language (XML) file format, a comma separated values (CSV) file format, and an XML interchange format for common language (XCL), and so on. In one example, a reporting algorithm 185 can be configured to generate a payment confirmation report 600 in a proprietary format, where the format may be proprietary, for example, to the merchant 160 with which the reporting algorithm 185 is associated.

In the payment message 500A shown in FIG. 4, the buyer email 335A is a proxy email sent at the direction of the buyer 105 from a proxy which may be, for example, an issuer 150 or a payment application provider 165, such as a third party processor or value added reseller (VAR). In this example, the buyer email 335A provides identifying information which can be parsed by the parsing module 125 using an identifying parsing algorithm 175 to identify the buyer 105, in this example, "XYZ Corp" and to identify the payment application provider 165 sending the proxy payment message 500A, in this example, "Providerproxy.com" which may be a third party processor for processing the MASTERCARD® payment for which payment card data 345 and invoice information 340 is detailed in the payment data 110 of the payment message 500A. In this example, the parsing module 125 can then use the merchant identifying information and/or the buyer identifying information to select an information parsing algorithm 275 which has previously been associated in the payment portal 120 with the merchant 160 and/or the buyer 105. The payment data 110 in the payment message 500A is then parsed using the selected information parsing algorithm 275 to obtain the payment information required to process the payment requested by the payment message 500A. In one example, the information parsing algorithm 275 can be configured to decrypt encrypted information from the message 500. The parsed payment information is provided, via the portal, to one of the payment modules 130, 135, 140 for processing using a selected payment algorithm 180 associated with the payment application 290 specified in the payment message 500A. In the example shown in FIG. 4, the specified payment application 290 is a ghost card payment, as described in further detail herein.

In the example shown in FIG. 5, the payment message 500B is originated from a buyer email 335B and is sent directly from the buyer 105 to the payment portal 120. The payment message 500B includes payment data 110 including identifying information which can be parsed by the identifying parsing algorithm 175 to identify the buyer 105, in this example, "XYZ Corp" and the merchant 160 to which payment is being directed, in this example, "ABC Corp." Using the buyer identifying information including the buyer email 335B and/or the merchant identifying information including the merchant assigned email 235, the payment portal selects the information parsing algorithm 275 which has been previously associated with the buyer and/or merchant identifying information in the portal data store 145, and parses the payment data 110 in the payment message 500B to obtain the payment information required to process the payment requested by the payment message 500B. The parsed payment information is provided, via the portal, to one of the payment modules 130, 135, 140 for processing using a selected payment algorithm 180 associated with the payment application 290 specified in the payment message 500A. In the example shown in FIG. 4, the specified payment application 290 is a virtual single use card, as described in further detail herein.

The network 115 is generally a packet network, e.g., operating according to transfer control protocol/Internet protocol (TCP/IP). Although one network 115 is shown, the network 115 may include one or more networks and may include various elements such as switches, routers, convention computer servers, virtual computer servers, etc., the one or more networks being a network such as the Internet, a wide area network, a local area network, a cellular network, a wireless network, etc.

Payment portal 120 generally includes one or more computer servers 170, i.e., devices with one or more processors and one or more memories, that host one or more of the modules 125, 130, 135, 140, 355, 360. References herein to the payment portal 120 collectively encompass such one or more computer servers 170, which can also be referred to herein collectively as a portal server 170. In an illustrative example, the payment portal 120 can include and/or be configured as an internal portal including modules 125, 130, 135, 140, 355, 360 and algorithms 175, 275, 375, 350, 180 and 185, for receiving payment messages 500, payment data 110, for processing and settlement of payment transactions and determining adjusted interchange rates and/or buyer rebates on behalf of buyers 105 and merchants 160 as described herein. The payment portal 120 can be hosted within an intranet such that access to the payment portal 120, including access to the data store 145, data tables 200, 300, 400, modules 125, 130, 135, 140, 355, 360 and algorithms 175, 275, 350, 375, 180 and 185, can be limited to authorized users. Payment data 110 transmitted by buyers 105 can be received into the payment portal 120, and the payment portal 120 can generate reports 440, 460, notification messages 600, etc. which are provided to merchants 160 and/or to buyers 105 from the payment portal 120, although it would be understood that neither buyers 105 nor merchants 160 would have access to the internal portal of the payment portal 120. In one example, the payment portal 120 can include an internal portal as described herein, and can further include an external portal, email server, website, website interface, or other means for communicating with the network 115 and through the network 115 with one or more of buyers 105, merchants 160, issuers 150 and payment application providers 165. The payment portal 120 selectively communicates, e.g., via the network 115, with one or more computer servers included in one or more buyers 105, one or more issuers 150, and/or one or more merchants 160.

In the examples shown in FIGS. 1 and 8, for simplicity of illustration, an example one of the one or more buyers 105 is shown including a buyer server 195 and a buyer website 190, an example one of the one or more issuers 150 is shown including an issuer server 270 and an issuer website 265, an example one of the one or more merchants 160 is shown including a merchant server 245 and a merchant website 240, an example one of one or more merchant banks 365 including a merchant bank website 370 and a merchant bank server 380, an example one of the one or more payment application providers 165 is shown including a provider server 255, a provider communication interface such as a provider website 250, and a provider data store 260, for example, for storing and/or processing payment card data 345 and/or token identifiers 295. In addition to the modules 125, 130, 135, 140, 355, 360 the portal 120 may include other modules, algorithms, and/or sets of computer-executable instructions for performing operations as disclosed herein. For example, the portal 120 generally includes parsing algorithms and/or instructions 175, 275, 375 for receiving and parsing payment data 110, payment and settlement algorithms 180, 350 for processing the payment according to the payment application 290 required by the payment data 110, reporting algorithms 185 for sending confirmation data 155, settlement outputs 440, and/or associated transaction data 460 in a format prescribed by the merchant 160 receiving the confirmation data 155 and transaction data 460 and/or the payment application provider 165 and/or issuer 150 receiving the settlement output 440, and otherwise communicating with other elements in the system 100, managing communications between modules included within the portal 120, etc. By way of illustrative example, the parsing module 125 includes a plurality of parsing algorithms 175, 275, 375 including at least one parsing algorithm 175 for initially parsing the payment message 500 to obtain the merchant identifying information, such as the merchant ID 285 and/or the assigned merchant email 235, and/or buyer identifying information such as the name of a buyer 105 or buyer email 335, which may be referred to herein as an identifying parsing algorithm 175, an identifying algorithm 175, or collectively as identifying parsing algorithms 175. The parsing algorithms 175, 275, 375 include one or more additional parsing algorithms 275 for parsing various formats of payment messages 500 which are received by the payment portal 120 to obtain payment information 110 from the payment message 500, which may be referred to herein as an information parsing algorithm 275 or collectively, as information parsing algorithms 275. The parsing algorithms 175, 275, 375 include one or more additional parsing algorithms 375 for parsing various formats of payment messages 500 which are received by the payment portal 120 to obtain adjustment factor data 485 from the payment message 500, which may be referred to herein as an adjustment factor parsing algorithm 375 or collectively, as adjustment factor parsing algorithms 375. By way of example, the payment portal 120 can include a plurality of payment and settlement algorithms 180, 350 for processing and settlement of the various types of payments as directed by the buyer 105 via the payment message 500, and can include a plurality of reporting algorithms 185 for generating various types of notifications, reports, and communications as directed by the merchant 160, as described in further detail herein.

Figure 2:
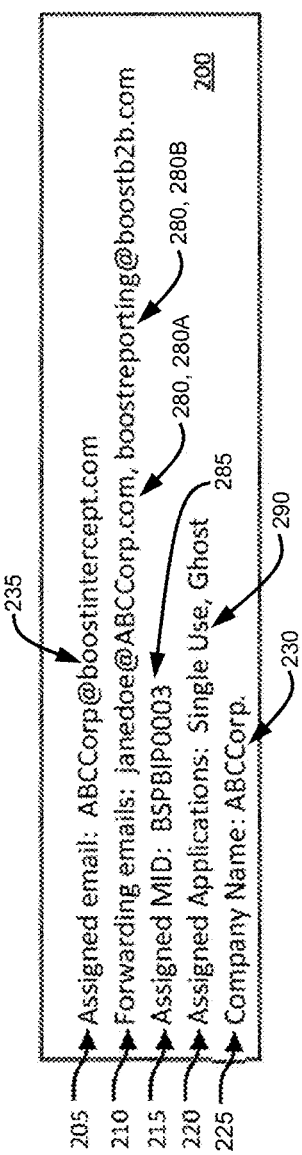
FIG. 2 provides an exemplary illustration of a merchant profile table.
Figure 3:
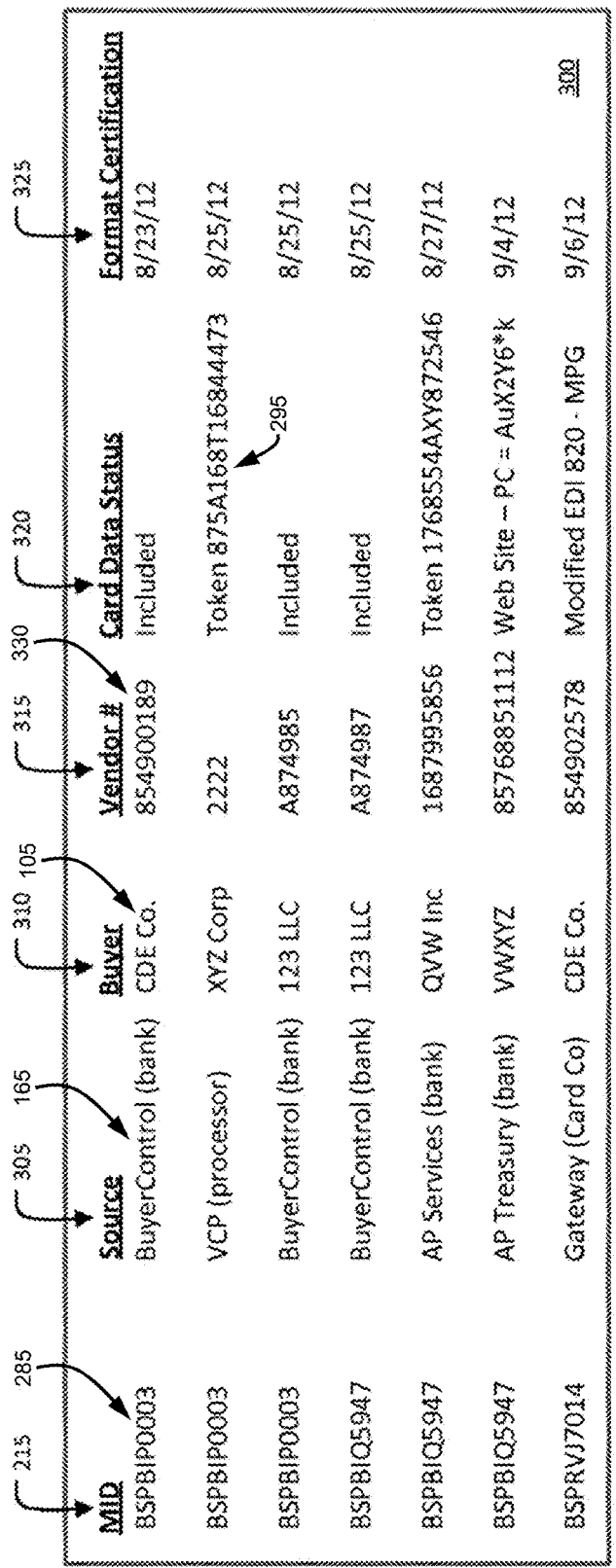
FIG. 3 provides an exemplary illustration of a transaction reference table.

The portal 120 generally also includes the data store 145, which may itself be a separate storage device and/or a database such as a relational database. In general, the data store 145 may be included in or communicatively coupled to a server 170 included in the portal 120. In any event, the portal data store 145 generally includes information for processing payment transactions on behalf of one or more merchants 160. As used herein, "merchant" refers to any party that is the recipient or intended recipient of a payment. Thus, information included in the data store 145 may include a merchant identifier 285, also referred to as a merchant ID 285, that uniquely or substantially uniquely identifies a merchant 160, one or more email addresses via which payment data 110 may be sent to the portal 120 on behalf of a particular merchant 160 by one or more buyers 105, information concerning how a payment is to be processed, for example, the payment applications 290 from which the merchant 160 will receive payment, and/or payment card information (e.g., an account number, expiration date, a security code, etc.), depository account information for how a payment is to be deposited to a merchant 160 account in a merchant's bank 365, as well as other information associated with a merchant, such as a company name, address, contact information, etc. Further details concerning exemplary information included in the data store 145 are provided below, including with respect to FIGS. 2 and 3. As described previously herein, the data store 145 can include information regarding each buyer 105 submitting payment instructions and/or payment messages 500 to the payment portal 120, including, for example, a buyer name, buyer email 335, payment application 290 information for payment applications used by the buyer 105, etc. In an example shown in FIG. 2, the information related to each merchant 160 can be stored in the data store 145 in a merchant profile table 200. Likewise, the information related to each buyer 105 can be stored in the data store 145 in a buyer profile table (not shown in the figures). The examples shown in FIGS. 2 and 3 are illustrative and non-limiting, and it would be understood that the profile tables for each of the merchants 105 and each of the buyers 160 could include additional data fields, including data fields storing a link or reference to one or more algorithms 175, 275, 375, 350, 180, 185 and/or adjustable interchange and/or rebate rate tables 400 associated with the merchant 160 and/or the buyer 105 whose data is included in the profile table. The data stored in the portal data store 145 for each merchant 160 and buyer 105 can be collected, for example, during registration of the merchant 160 and/or buyer 105 to the payment portal 120.

The parsing module 125 parses payment data 110 to identify various information. For example, the parsing module 125 parses the payment data 110 first with an identifying parsing algorithm 175 to obtain information identifying a merchant 160 on whose behalf a payment is to be processed. For example, if payment data 110 is included in an email, the parsing module 125 may identify the destination address of the email, which then may be associated with a particular merchant 160 as described further below. That is, the portal 120 may receive email messages from a variety of sources including a variety of destination addresses. As described further below, by matching both a merchant ID 285 and a destination email address and/or other information included in payment data 110, the parsing module 125 may identify specific steps and/or specific payment and/or settlement algorithms 180, 350 for processing a payment transaction identified in the payment data 110. For example, a unique merchant email address 235 assigned to a merchant 160 may identify a merchant ID 285 associated with the merchant 160, which in turn provides a mechanism for looking up instructions and/or requirements specific to a merchant 160 and/or a buyer 105 in the data store 145, where the instructions can include instructions to use a specific information parsing algorithm 275 and/or adjustment factor parsing algorithm 375 which is associated in the parsing module 125 with the specific merchant ID 285 and/or with the merchant assigned email 235, to parse the payment message 500 to obtain payment information from the payment message 500, using specific payment and or settlement algorithms 180, 350 for processing the payment transaction identified in the payment data 110 which can include determining and/or adjudicating an adjusted interchange rate 425 and applying the adjusted interchange rate 425 to the payment, and/or using a specific reporting algorithm 185 for generating reports, confirmation emails, etc. to the merchant 160 in a format specified by the merchant 160.

Information obtained by the parsing module 125 is used to determine what additional module or modules, and/or what additional algorithms 180, 185, 275, 350, 375 the portal 120 may use for processing a payment transaction indicated by the parsed payment data 110. For example, the card payment module 130 includes one or more payment instructions and/or algorithms 180, 185, 350 for processing payment data 110 that can be matched to a merchant identifier 285 stored in the data store 145. The non-identified merchant module 135 includes instructions and/or algorithms 180, 185 for processing payment data 110 that cannot be matched to a merchant identifier 285 stored in the data store 145, e.g., that is sent to an email address not associated with any merchant identifier 285 in the data store 145. Further, the BICP module 140 and/or the dynamic rate module 355 and adjudicator module 360 and the associated payment and settlement algorithms 180, 185, 350 may be invoked when the parsing module 125 determines that payment data 110 is intended to initiate a buyer-initiated card payment transaction, e.g., through a BICP specific payment gateway. Operations of the modules 130, 135, 140, 355, 360 are described further below.

Exemplary Data Elements

FIG. 2 provides an exemplary illustration of a merchant profile table 200 that may be included in the data store 145. An assigned email field 205 stores an email address 235 assigned to a merchant, i.e., merchant 160, associated with a record in the table 200. This merchant assigned email address 235 may be used by the buyer 105, or often by a proxy for the buyer 105, as discussed below, to send payment data 110 to the portal 120. The portal 120 can parse a payment message 500 with an identifying parsing algorithm 175 to obtain and match a merchant assigned email address 235 in payment data 110 to a merchant assigned email address 235 stored in assigned email field 205, to identify a merchant 160 on whose behalf a payment transaction is to be processed.

Figure 13:
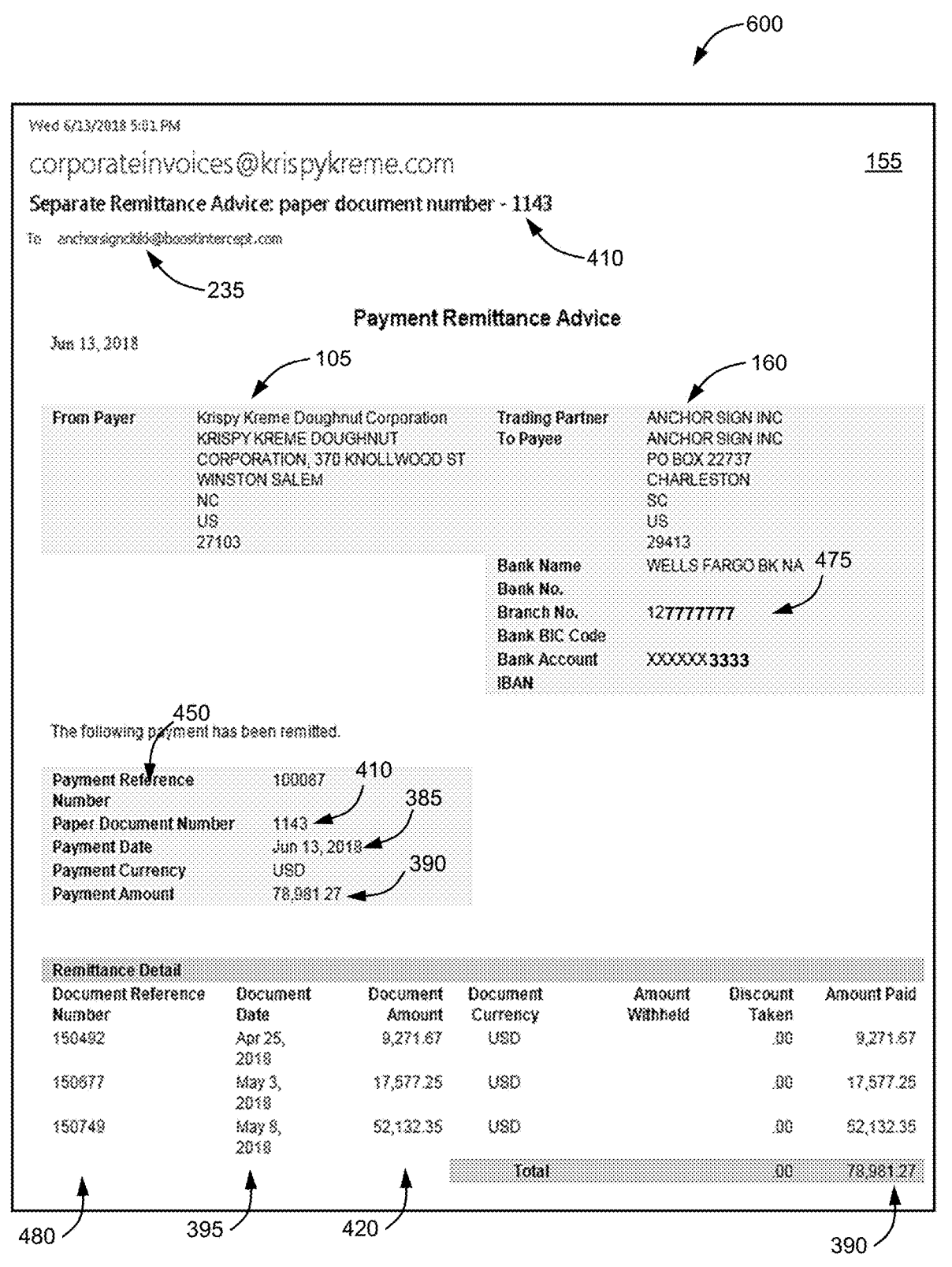

A forwarding emails field 210 stores one or more notification email or other messaging addresses 280 to which payment data 110 is to be forwarded. For example, the portal 120 may include instructions to forward payment data 110 to the notification addresses 280 specified in the forwarding emails field 210. In the example shown in FIG. 2, the notification addresses 280 include a notification address 280A "janedoe@ABCCorp.com" for sending reporting information, such as a confirmation message 600, to a representative of the merchant 160 "ABCCorp", and another notification address 280B "boostreporting@boostb2b.com" for sending reporting information to the portal 120, for example, for storage to the data store 145 and/or to a transaction history file in the data store associated with the merchant 160 and/or the buyer 105. A reporting algorithm 185 corresponding to a reporting format specified by the merchant 160, for example, at registration of the merchant 160 to the payment portal 120, can be associated with the notification email addresses 280 such that, when a report is generated to the merchant 160, the associated reporting algorithm 185 is used to generated the report in the format specified by the merchant 160. Alternatively or additionally, the portal 120 may include instructions to send other information, e.g., confirmation data 155 and/or associated transaction data 460, to addresses specified in the forwarding emails field 210. In a non-limiting example, examples of confirmation messages 600 including confirmation data 155 are shown in FIGS. 6 and 13. The confirmation data 155 includes, in the examples shown, invoice information 340 including one or more of the merchant's invoice number 480, the invoice date 395, the amount 390 paid toward the invoice(s), and the payment date 385 on which the payment to the merchant 160 was confirmed.

An assigned merchant ID (MID) field 215 stores a unique or substantially unique identifier 285 for the merchant 160. The unique merchant identifier 285 may be referred to herein as a merchant ID, and is associated in the data store 145 with the unique merchant assigned email address 235 assigned to the merchant 160. In one example, one or more of the algorithms 175, 275, 375, 350, 180, 185 are associated in the data store 145 with the merchant ID 285 and/or the unique merchant assigned email address 235 for processing of payment data 110 received by the payment portal 120 related to the merchant 160 assigned the merchant assigned email address 235.

An assigned applications field 220 lists one or more payment applications 290 available to the merchant 160 associated with the given record in the table 200. Possible payment applications 290 include private label applications, electronic funds transfer, line of credit, credit card, etc., which can be processed through a payment application provider 165 such as, for example, a bank, third party processor, and/or payment gateway, as illustrated in the transaction reference table 300 shown in FIG. 3. For example, "Single Use" shown in the assigned applications field 220 specifies that a payment application 290 processing a payment utilizing a virtual, or single use, card may be used for transactions involving the merchant 160. "Ghost" shown in the assigned applications field 220 specifies that a payment application 290 processing a payment utilizing a ghost card may be used for transactions involving the merchant 160. In a non-limiting example, other types of payment applications 290 and payment application providers 165 are illustrated in the transaction reference table 300 shown in FIG. 3. For example, "Gateway," shown in FIG. 3, may be used to specify that a payment gateway, e.g., the MasterCard Payment Gateway, as a payment application provider 165 which may be used to process payments via the payment portal 120 for a merchant 160 assigned the merchant ID 285 "BSPRVJ7014." For example, the assigned applications field 220 can list a third party processor, sometimes referred to as a value-added reseller (VAR), where "VAR" specifies that payment data 110 may be sent to a value added reseller (VAR) or partner of the portal 120 for processing. In the example shown in FIGS. 2 and 3, a third party processor "VCP" is indicated as a payment application provider 165 for processing a tokenized payment for merchant 160 having the merchant name 230 "ABC Corp" having the merchant assigned email 235 "ABCCorp@boostintercept.com" and the assigned merchant ID 285 "BSPBIP0003". A company name field 225 provides a merchant name 230 of the merchant 160. This merchant name 230 may be used in emails, reports, or the like. In the example shown, the merchant's name is shown as "ABC Corp."

FIG. 3 provides an exemplary illustration of a transaction reference table 300 that may be included in the data store 145. Records in the transaction reference table 300 include a Merchant ID (MID) 215, described above with respect to FIG. 2. Further, the transaction reference table 300 includes a source field 305. The source field 305 includes a source of payment data 110. As mentioned above, payment data 110 may be provided by a buyer 105, but often is provided only indirectly by the buyer 105, i.e., is provided by a payment processing entity, e.g., a payment application provider 165, on behalf of the buyer 105. Thus, the source field 305 identifies this entity, whether it be the buyer 105 itself an issuer 150, a payment application provider 165, or some other entity.

A buyer field 310 identifies the buyer 105. As just mentioned, in some cases, the data in the source field 305 may match the data in the buyer field 310. In the example shown in FIG. 3, merchant ID 285 "BSPBIP0003" assigned to merchant 160 "ABC Corp" is associated in the transaction reference table 300 with a plurality of different buyers 105 including buyers "CDE Co.", "XYZ Corp" and "123LLC". For each of these buyers 105, a source 305 of payment information 110, a vendor number 330 assigned by the respective buyer 105 to merchant 160 "ABC Corp", and a card data status 320 is shown. The payment portal 120 can associate with each respective combination of a buyer 105 and merchant 160, one or more algorithms 175, 275, 350, 375,180, 185 for processing payment data 110 received directly or by proxy from that respective buyer 105 requesting processing of a payment to that respective merchant 160. In an illustrative example, referring to example payment message 500A shown in FIG. 4 initiated by a proxy for buyer 105 "XYZ Corp" to process a payment to merchant 160 "ABC Corp." using a ghost card which must be tokenized to submit the payment to the payment application provider 165 "VCP" identified in the transaction reference table 300 in FIG. 4 as associated with payment transactions between MID 285 "BSPBIP0003" (ABC Corp) and buyer 105 "XYZ Corp", the payment portal 120 can associate a plurality of algorithms with the respective combination of buyer 105 "XYZ Corp" and merchant 160 "ABC Corp" to process a payment transaction between buyer XYZ and merchant ABC, including a first algorithm which is an identifying parsing algorithm 175 to parse the incoming payment message 500A, a second parsing algorithm which is a selected information parsing algorithm 275 configured to parse for ghost card payment data 110 in the payment message format shown in the payment message 500A, a third algorithm which is a selected payment algorithm 180 configured to tokenize and process the ghost card payment data 110 parsed from the payment message 500A by the second parsing algorithm, and a fourth algorithm which is a selected reporting algorithm 185 for generating the confirmation message 600 to merchant ABC in a format specified by merchant ABC, as shown in FIG. 6.

Referring again to FIG. 3, the transaction reference table 300 can include a vendor number field 315 which stores a vendor number 330 used by the buyer 105 indicated in the buyer field 310 to identify the merchant 160 indicated by the merchant ID 285 in the MID field 215. The vendor number 330 is generally a unique or substantially unique merchant 160 identifier assigned by the buyer 105 to the merchant 160 within its accounts payable system. Further, a buyer 105 may associate one or more vendor numbers 330 with a merchant 160. For example, if the buyer 105 uses different vendor numbers 330 to manage different business segments within the buyer 105 organization, for different reporting needs or for different modes of payment with respect to one merchant 160, e.g., some invoices are paid with a ghost card and some invoices are paid with a virtual card, then the buyer 105 may have a first vendor number 330 for the merchant 160 indicating that the mode of payment is with a ghost card, and a second vendor number 330 for the same merchant 160 indicating a virtual card mode of payment.

A card data status field 320 includes information for obtaining payment card information. For example, "Included" in the field 320 indicates that card data, such as a card account number, expiration date, etc., is to have been included in the payment data 110 provided by the buyer 105 in the payment message 500. For example, payment data 110 may be an encrypted email, and the payment portal 120 and/or the parsing module 125 can include instructions to use an information parsing algorithm 275 configured to decrypt and/or parse payment card data 345 from the encrypted email, and to use a selected one of the payment algorithms 180 which is configured to submit the payment card data 345 to a payment application provider 165, for payment processing. In one example, the card status field 320 can include information for decrypting the encrypted email, for example, a decryption key stored to the data store 145 or instructions for obtaining a decryption key.

An indication of a "Token" in the field 320, generally followed by a token identifier 295, is generally found where payment data 110 is to be used to process a payment using a ghost card. A token is a unique or substantially unique identifier for ghost card information, e.g., the card account number, expiration date, etc., and may be used to secure the ghost card information. The ghost card information, including a card number and other information necessary to place a charge on the ghost card, may be placed in a data store maintained by a third party processor 165 sometimes referred to as a value-added reseller (VAR), and which may be referred to herein as a payment application provider 165. The token identifier 295, used in lieu of the actual ghost card number, may be used to obtain authorization from a card issuer 150 to charge the ghost card. The payment portal 120 and/or the parsing module 125 can include instructions to use a selected one of the information parsing algorithms 275 configured to parse the ghost card data 345 from the payment data 110, and to use a selected one of the payment algorithms 180 which is configured to tokenize and process ghost card data to process the payment.

An indication of "website" in the field 320, generally followed by an identifier for a website, uniform resource locator (URL), etc. may indicate that payment card information is to be obtained from a third party website 250, 265 or buyer website 240, or some other remote mechanism or communication interface such as obtaining payment card information by a secure or unsecure messaging protocol, secure file transfer protocol (SFTP or FTPS), etc., as may likewise be indicated. The payment portal 120 and/or the parsing module 125 can include instructions to use a selected one of the information parsing algorithms 275 configured to parse website information from the payment data 110, and to use a selected one of the payment algorithms 180 which is configured to obtain process payment card information from a website and to submit the obtained information to a payment application provider 165, to process the payment.

Further, e.g., in cases where an application assigned to the merchant 160 includes a gateway, the field 320 may indicate a format for a file to be transferred to the gateway. For example, "Modified EDI 820" is a format for transferring payment data 110 to the MasterCard Payment Gateway. The payment portal 120 and/or the parsing module 125 can include instructions to use a selected one of the information parsing algorithms 275 configured to parse payment data 110 to obtain the information required to build the gateway file, and to use a selected one of the payment algorithms 180 which is configured to compile the payment data 110 in the file format required by the gateway and to submit the file to the gateway, to process the payment.

In cases where the card data status field 320 indicates the payment is to be processed using an adjusted interchange rate, the payment portal 120 and/or parsing module 125 can include instructions to use an adjustment factor parsing algorithm 375 configured to parse one or more adjustment factors 485 from the payment message 500 and/or payment information 110, and to use a selected at least one settlement algorithm 350 and a selected at least one rate table 400 to determine and apply an adjusted interchange rate and/or adjusted rebate rate to process the payment.

A format certification field 325 indicates a date on which a format notice for payment data 110 and/or confirmation data 155 has been certified, the process being a test that a payment message 500 in the form of an instruction, email or file, etc., has been received from the buyer 105, parsed using a first algorithm 175 to obtain merchant 160 and/or buyer 105 identifying information, parsed using a second parsing algorithm 275 to obtain payment data 110, parsed using a third parsing algorithm 375 to obtain adjustment factors 485, that the payment data 110 including payment instructions in the payment message 500 were correctly being interpreted by the portal 120 and that a selected payment algorithm 180 and a selected settlement algorithm 350 corresponding to the payment application 290 designated by the payment data 110 was applied to process the payment using the appropriate payment application 290 and/or third party processing application 290 and rate tables 400, where the format notice sent to the merchant 160 and/or buyer 105 is formatted using a reporting algorithm 185 meeting the merchant 160 reporting requirements.

As described in additional detail herein, the data tables 200 and 300 and rate tables 400 can be used together to process a payment transaction for a merchant 160. For example, the portal 120 may receive payment data 110 from a buyer 105 (or from a proxy for the buyer 105), whereupon the parsing module 125 or some other module in the portal 120 can execute an identifying parsing algorithm 175 to identify the destination email address that can be matched to a merchant assigned email address 235 in the assigned email field 205 in the merchant profile table 200. Accordingly, the portal 120 can determine the MID 285 stored in the MID field 215 associated with the received email address 235. The portal 120 may further identify a vendor number 330 in the payment data 110. The portal 120 may then query the transaction reference table 300 using the destination email address, e.g., the merchant assigned email address 235, and the vendor number 330 in the payment data 110 along with the MID 285 retrieved from the merchant profile table 200 to locate an appropriate record in the transaction reference table 300 for processing the payment or payments requested in the payment data 110. More specifically, the portal 120 may use contents of the card data status field 320 to obtain, in the cases of virtual card or ghost card transactions, payment card information 345 or information on obtaining such information via a website, message 500, or the like, or, in the case of a transaction to be processed by a card provider gateway, information about a format of payment data 110 to be sent to the card provider gateway. The portal 120 can execute one or more algorithms 175, 275, 375, 350, 180, 185 associated with the appropriate record in the transaction reference table 300, e.g., associated with the specific combination of the merchant 160 identified by the MID 285 in the appropriate record, and the buyer 105 in the appropriate record, as described previously, to process the payment.

Figure 11:
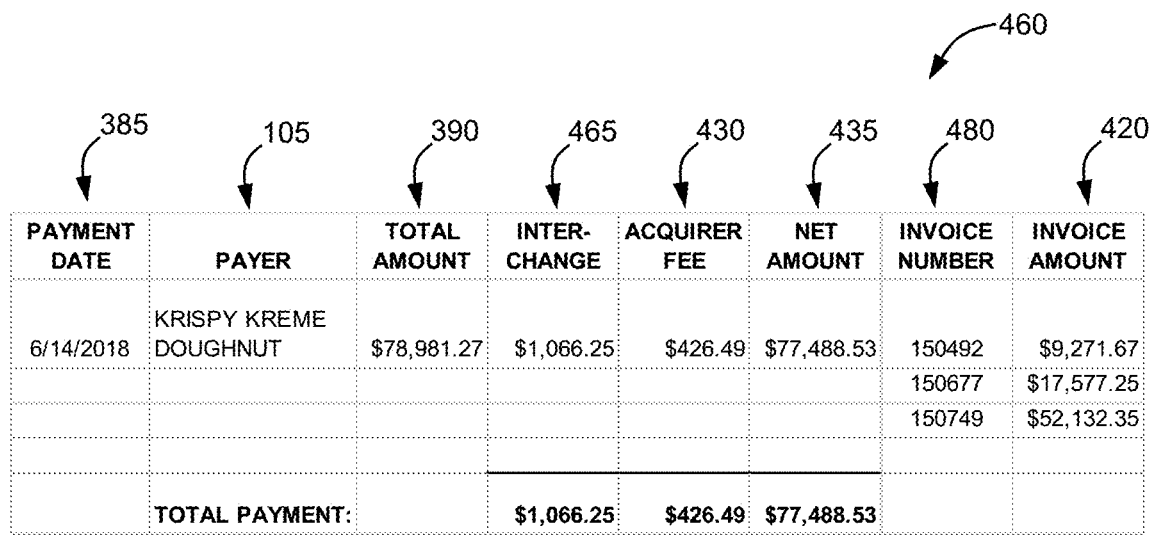
FIG. 11 illustrates an example of a transactions report of transactions associated with the settlement output of FIG. 9, showing an adjusted interchange fee applied to the transaction amount.

Referring to FIGS. 10 and 11, a settlement output 440, also referred to herein as a settlement file, can be prepared by the payment portal 120, for example, using the selected one of the payment modules 130, 135, 140 in combination with the dynamic rate module 355 and/or the adjudicator module 360 and one or more payment, settlement and/or reporting algorithms 180, 185, 350. The settlement output 440 is prepared by the payment portal 120 for submission to a payment application provider 165 and/or to the issuer 150, to request authorization of the payment, as shown at 740 in the method 700 and process diagram shown respectively in FIGS. 8 and 9. The settlement output 440 can include, as shown in FIG. 10, a transaction ID for tracking the payment authorization request through the payment network, a customer (buyer) ID, the transaction date 385, a description of the transaction including whether a dynamic key, for example, an adjusted interchange rate, was applied to the transaction to generate, for example the adjusted interchange fee 465 including in the "Associated Transactions" 460 addended to the settlement output 440, and a bank settlement number 410 associated with settlement data included in the settlement output 440. The associated transactions data 460 can be formatted, in a non-limiting example shown in FIG. 11, as an associated transactions report 460 which can include, for example, a payment date 385, the payer/buyer 105, the total amount of payment determined from the payment message 500 and/or payment information 110 parsed therefrom to be funded by the issuer 150 on behalf of the buyer 105, an adjusted interchange fee 465 determined, for example, by applying adjustment factors 485 parsed from the payment information 110 and/or payment message 500 to a selected adjustable interchange rate table 500 associated with the buyer 105, merchant 160 and/or the issuer 150 of the payment to which the settlement file 440 is directed, other fees such as an acquirer fee 430 to be paid from the payment proceeds, a net payment amount 435 to be deposited to the merchant's account in the merchant's bank 365, and invoice information 340 including, for example, the invoice number(s) 480 and respective invoice amount(s) 420 of the invoice(s) being settled in the payment transaction.

Figure 12:
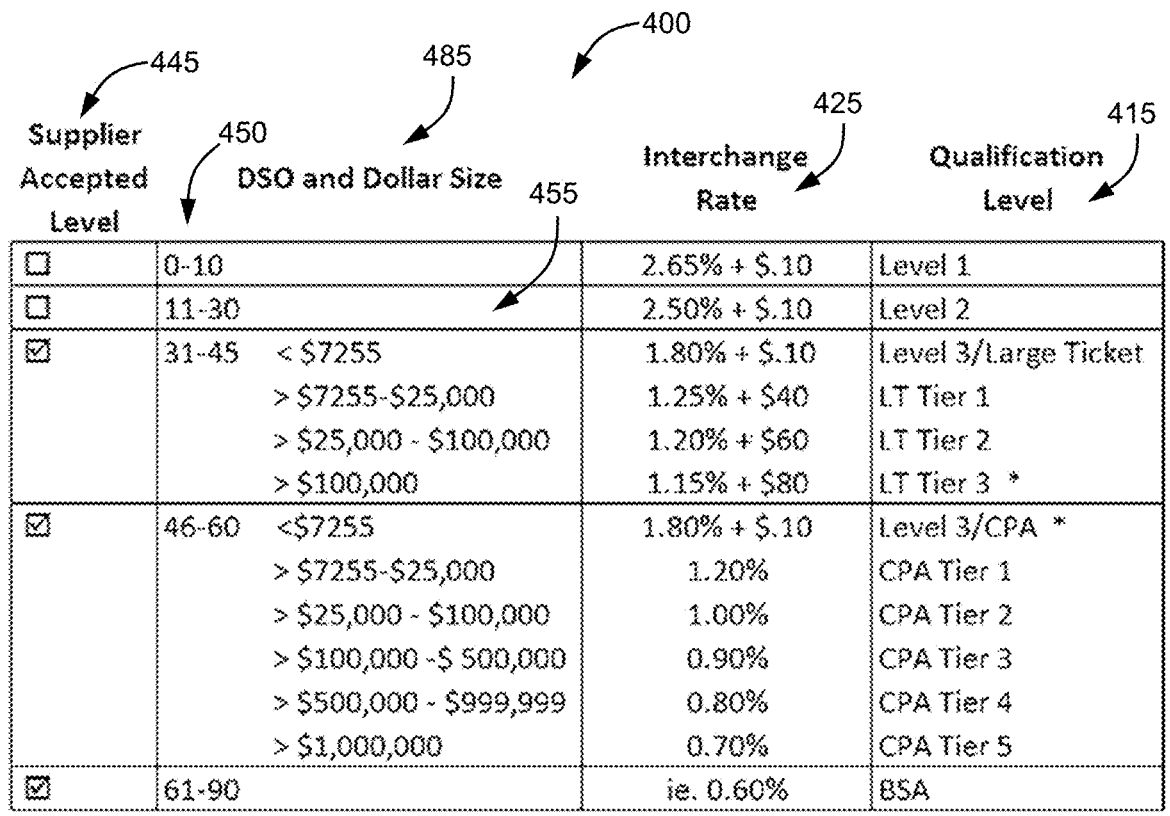
FIG. 12 provides an exemplary illustration of an interchange rate table.

FIG. 12 shows an example adjustable interchange rate table 400, for determining an adjusted interchange rate 425 to be applied to the payment information 110 to determine an adjusted interchange fee 465 to be deducted from the payment amount 390 during processing of the payment using the method 700 described herein. In the example shown in FIG. 12, the adjustable interchange rate table 400 includes one or more adjustment factors 485 which are used to select an adjusted interchange rate 425 from the rate table

400. The content of the adjustable interchange rate table 400, in one example, is agreed to by the buyer 105, the buyer's issuer 150 and the merchant 160 associated with the payment transaction to which the adjusted interchange rate is being applied. In one example, the adjustable interchange rate table 400 may be applicable to a particular market segment, product segment, service segment, or commodity, as illustrated in the example shown in FIG. 8, where payment portal 120 and/or the data store 145 can include a plurality of data tables 400 including specific grouping of data tables 400 for various segments such as, in the example shown, "Healthcare", "Energy and Fuel", "Media", etc. The commodity and/or segment with which a specific buyer is associated may be indicated, for example, in a buyer profile stored in the payment portal 120 and/or data store 145 and used by the dynamic rate module 355 in selecting the appropriate adjustable interchange rate table 400 to be used in determined an adjusted interchange rate 425 for the payment transaction. In the example shown in FIG. 12, the adjustable interchange rate table 400 includes a "Supplier Accepted Level" field 445 which indicates the various levels to which the supplier/merchant 160 and/or buyer 105 has agreed to apply an adjusted interchange rate 425. The rate table 400 further includes adjustment factors 485 to be used in determined the adjusted interchange rate 425 for a payment transaction, which in the non-limiting example shown include days sales outstanding (DSO) of the invoice(s) included in the payment transaction being processed, and the dollar size 455 of the invoice amount(s) including in the payment transaction being processed. An adjusted interchange rate 435 and qualification level 415 is associated with each combination of the adjustment factors 450, 455. The qualification level 415, for example, may be agreed upon and/or controlled by a business services agreement negotiated and/or agreed with the issuer 150.

In a non-limiting example, the adjusted interchange rate 425 is determined for a payment transaction by the payment portal 120, the dynamic rate module 355 and/or the adjudicator module 360 by selecting the adjustable interchange rate table 400 associated with the buyer 105, merchant 160 and issuer 150 identified by the payment information 110 of the payment transaction being processed, applying adjustment factors 485, in the present example, DSO 450 and dollar size 455 to the adjustable interchange rate table 400, and determining an adjusted interchange rate 425 for the payment transaction. In one example, referring to the payment message 500C shown in FIG. 9, the payment information 110 can include multiple invoices 340 having different adjustment factors 485, such as different DSOs 450 determined from the payment date 385 and the different invoice dates 395 and different dollar sizes 455 shown in the differing invoice amounts 420. As such, a different adjusted interchange rate 425 may be determined for each of the invoices 480 including in the payment information 110. In the present example, the payment portal 120 and/or the adjudicator module 360 can apply one or more settlement algorithms 350 to adjudicate the different adjusted interchange rates 425 determined for each of the respective invoice numbers 480, to determine an adjudicated adjusted interchange rate 425 to be applied to the total payment amount 390. In one example, the adjudicator module 360 and/or the settlement algorithm 350 can use a weighting method and/or determine an adjudicated adjusted interchange rate 425 using a weighted average of the adjusted interchange rates 425 determined for the different invoices, based, for example, on one or more of the adjustment factors 485. In one example, the adjudication method may be determined by agreement with the buyer 105, the merchant 160 and the issuer 150 associated with the payment transaction being processed.

Payment Data Examples

FIG. 4 illustrates an example of payment data 110 in a payment message 500 which is in the form of a proxy email 500A where the mode of payment is via a ghost card, where the proxy email 500A is sent by a payment card issuer ("issuer") 150, or a third party serving as issuer's and/or payer's proxy, as described previously herein. The payment message 500 shown in FIG. A as an email 500A includes a destination address shown as "ABCCorp@boostintercept.com" that may be recognized by the parsing module 125 and matched to a merchant assigned email address 235 stored in assigned email field 205. Further, an "Account Number" may be matched to data, such as a vendor number 330, in a vendor number field 315. Accordingly, the payment data 110 may be used, for example, by a payment algorithm 180 as described above to find or obtain a token that in turn may be used to access the ghost payment card information in a card data status field 320; note that the "MasterCard number" provided in the example of FIG. 4 is truncated. Ghost card numbers are generally not provided to buyers 105 in an e-mail notification or the like, but instead are provided once, and upon loading onto a third party processer secure card system 165 are tokenized and in the present example, the resulting token identifier 295 is stored in the table 300, such that the token identifier 295 may be passed to a card processor 165 to obtain payment card approval, for example, by executing a payment algorithm 180.

FIG. 5 illustrates an example of payment data 110 in a payment message 500 which is in the form of a secure email 500B where the mode of payment is via a virtual single use card. In the example shown in FIG. 5, the secure email 500B is secured by encryption, such that the payment data 110 included in the secure email 500B is encrypted. This email payment message 500B is similar to the email payment message 500A shown in FIG. 4; however, a full, rather than a truncated, card number is provided. Further, the "Customer Account Number" may be matched to data, such as a vendor number 330, in a vendor number field 315.

Figure 9:
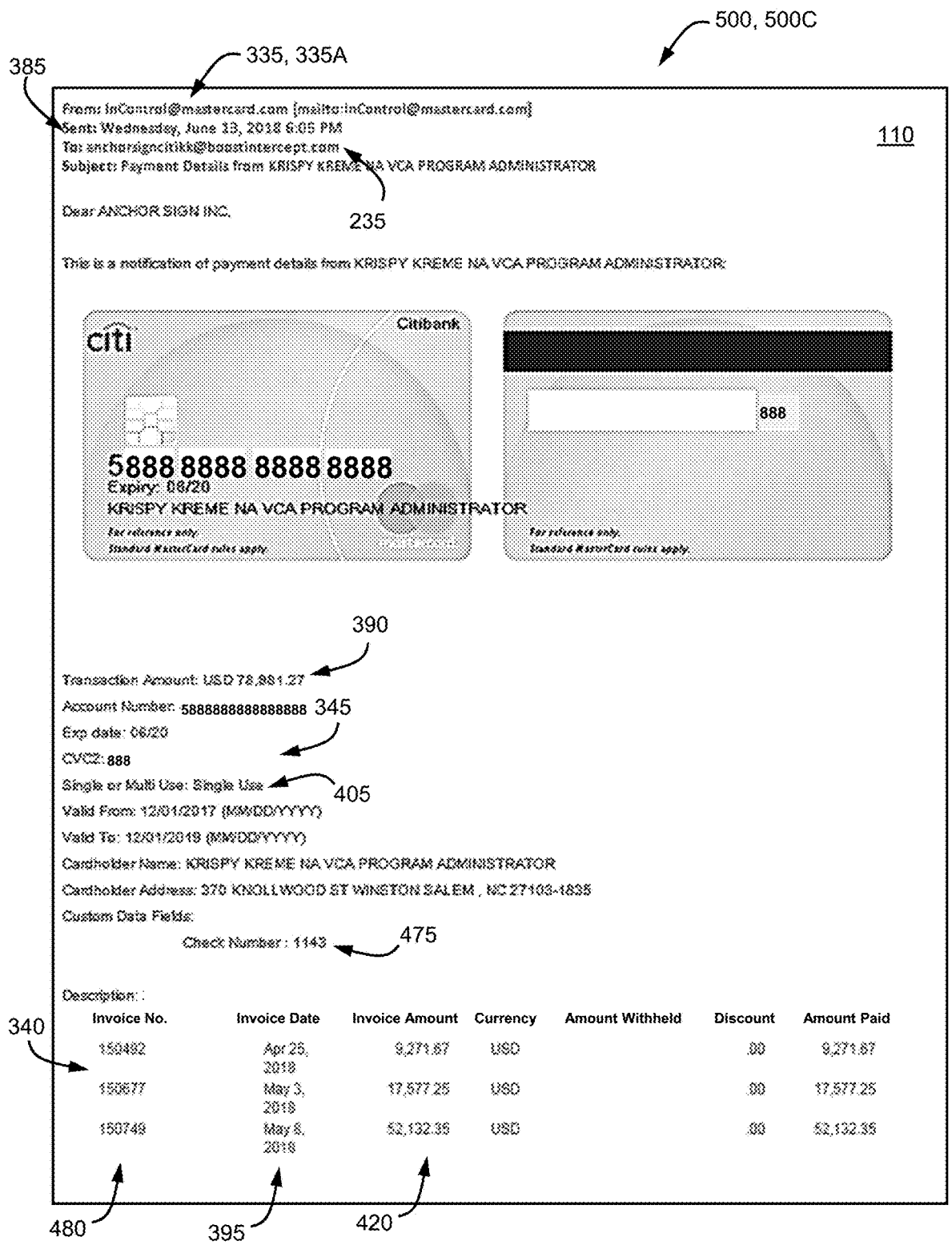
FIG. 9 illustrates another example of payment data in the form of an email where the mode of payment is via a virtual card.

FIG. 9 illustrates an example of payment data 110 in a payment message 500 which is in the form of a secure proxy email 500C where the payment mode 405 is via a single use card. In the example shown in FIG. 9, the proxy email 500C can be secured, for example, by encryption, such that the payment data 110 included in the email 500C is encrypted. This email payment message 500C is similar to the email payment messages 500A and 500B shown in FIGS. 4 and 5, and includes a "Check Number: 1143" which may be matched to data, such as a vendor number 330, in a vendor number field 315, or other data according to the format specified by the buyer 105 initiating the payment message 500C.

In another example of payment data 110 (not shown in the figures), the payment data 110 in a payment message 500 and/or other file format received by the payment portal 120, can be in the form of a "non-payment notice" received by the payment portal 120 from a third party which has processed the payment transaction on behalf of a buyer 105, including remittance and/or notification information from the third party including payment data 110 identifying the buyer 105, the merchant 160, the payment amount, and a confirmation that the payment transaction has been completed. As such, the term "non-payment notice" as used herein refers to payment data 110 received by the payment portal for a payment which has been completed by a third party in response to payment instructions provided to the third party by a requesting entity other than the payment portal 120. The requesting entity, when requesting the payment transaction through the third party, includes instructions to send the remittance and/or notification information confirming completion of the payment to the payment portal 120. In this way, the payment portal 120 can provide a consolidated report to a merchant 160 which includes both payments processed on behalf of the merchant 160 in response to instructions generated by the payment algorithms 185 of the payment portal 120, and payments processed on behalf of the merchant 160 in response to instructions from the non-portal requesting entity. The consolidated report, as previously described herein, is prepared using a reporting algorithm 185 which is specified by the merchant 160, for example, such that the report information, which may be provided in a predetermined file format such as XML, XCL, CSV, ACH, etc., can be imported directly into that merchant's account system, thus providing a time savings and reporting accuracy advantage to the merchant 160. In the present example, the third party providing the non-payment notice to the payment portal 120 has been registered to the payment portal and provided a destination email for use in transmitting the non-payment information to the payment portal and/or has included other identifying information in the payment message 500 and/or file received by the payment portal 120, such that when the non-payment notice is received and parsed by an identifying parsing algorithm 175, the parsing module 125 recognizes the incoming message and/or file as a non-payment notice and retrieves the information parsing algorithm 275 associated with the registered third party to then parse the incoming message and/or file to obtain the payment data 110 including payment remittance and/or confirmation information. In one example, the third party can be an issuer 150, a payment application provider 165, a gateway such a MASTERCARD® gateway or a VISA® gateway, or the like, where the buyer 105 is required to input payment information directly into an interface provided by the third party, and/or where the third party generates payment confirmation information in a fixed format which is different from the reporting format requested by the merchant 160. In this example, the third party provides the confirmation information in the third party format to the payment portal 120 as a non-payment notice, and the payment portal 120, using for example, a reporting algorithm 185 associated with the merchant 160, reports the third party payment to the merchant 160 in the format request by the merchant 160. In one example, reporting of payments which are processed through the payment portal 120 and payments processed by the third party can be combined in a consolidated report to the merchant 160, to enable the merchant 160 to import the consolidated payment directly from the report into the merchant 160's accounting system.

In another example of payment data 110 (not shown in the figures), the payment data 110 in a payment message 500 and/or other file format received by the payment portal 120, can include payment data 110 which is in a foreign language and/or a foreign currency, e.g., in a language and/or currency which is other than the language and/or currency in which the payment portal 120 is configured to operate. For example, the payment portal 120, when configured to operate with English and U.S. dollars as the default language and currency, would recognize, for example, payment data 110 in Chinese and/or Chinese Yuan, during parsing of the payment data 110, and process the payment message 500 and/or payment data 110 based on one or more algorithms 175, 275, 180, 185 associated with the processing of foreign language and/or foreign currency payment transactions, which can include, for example, redirecting processing of the payment transaction to a processor in a country qualified to process the foreign currency transaction.

Confirmation Data Examples

FIGS. 6 and 13 illustrate examples of merchant notification emails 600, and FIG. 11 illustrates an example of an associated transactions report 460 which can be generated by the portal 120 and outputted to the merchant 160 as notification and reporting that the payment transaction has been settled and completed. FIGS. 6 and 13 illustrate examples of confirmation data 155 generated by a reporting algorithm 185 associated in the form of a merchant notification email 600, notifying the merchant 160 identified in the forwarding e-mails field 210 of FIG. 2 which indicate that the payment instruction from the buyer 105 has been successfully authorized, will be settled and funding released into the banking network for deposit in the merchant's bank account 475. If the payment fails to be authorized, the transaction and detail concerning the declined payment will be routed to a customer service contact to reconcile through a help desk or the like, or to inform the buyer 105 or issuer 150 of the reason for the decline. The examples shown in FIGS. 6 and 13 are illustrative and non-limiting, and it would be understood that other reports can be generated to a merchant 160 and/or to a buyer 105 using one or more reporting algorithms 185 which are associated with the merchant 160 and/or buyer 105, for example, during registration of the merchant 160 and/or buyer 105 to the payment portal 120.

FIG. 11 illustrates an example of an associated transactions report 460 generated by a reporting algorithm 185 for a payment transaction subject to transaction processing fees such as an interchange fee 465 paid from the merchant's 160 payment 390 to the buyer's issuer 150, calculated at an interchange rate, and/or an acquirer fee 430 paid to an acquirer such as a payment processor or payment application provider 165. The associated transactions report 460 can be provided with and/or incorporated into the notification message 600 generated for the payment transaction, using, for example, the reporting algorithm 185. In the example shown, the information parsed from the payment message 500 using the identifying parsing algorithm 175 and/or the information parsing algorithm 275 identifies the payment transaction to the payment portal 120 as a payment transaction to which an adjustable interchange rate 425 is to be applied, such that the interchange fee 465 shown in the example associated transactions report 460 is an adjusted, e.g., non-standard, interchange fee 465 determined by the dynamic rate module 355 and/or the adjudicator module 360, using, for example, at least one settlement algorithm 350 and at least one interchange rate table 400 selected by the payment portal 120 and at least one adjustment factor 485 parsed from the payment message 500 initiating the payment transaction.

By way of illustration, the confirmation data 155 and, where applicable, the associated transactions report 460 for payments made to a respective merchant 160 can be consolidated into a report, which can be in the form of a message, a file such as an XML, XCL, ACH, CVS or other file format, for confirmed payments meeting one or more criteria specified by that respective merchant 160, where the reporting criteria can include, for example, all buyers 105 submitting payments to the respective merchant 160, a single buyer 105, or a group of buyers 105, a specific time frame such as a day, week, month, quarter, year, etc., a specific geographic area such as a state, country, region, continent, etc., a merchant or buyer location and/or division such as a headquarters, sales office, manufacturing plant, distributor, etc., a currency type, and the like, where the specific report format requested by the merchant 160 can be associated with and/or provided by a reporting algorithm 185.

The examples of a notification message 600 including confirmation data 155 and an associated transaction report 460 detailing an adjusted interchange fee 465 are non-limiting, such that the payment portal 120 and/or the reporting algorithms 185 can be configured to output other formats and reports. In one example, the payment portal 120 uses the dynamic rate module 355 and/or at least one of a reporting algorithm 185 and/or settlement algorithm 350 to generate buyer rebate data for those transactions which are subject to an adjustable interchange rate 425, to generate a report of the buyer rebate associated with the transaction. The buyer rebate, in one example, may be proportional to the adjustable interchange fee 465, and/or may be determined using one or more adjustable rebate rate tables 400 provided, for example, by the buyer's issuer 105, and stored to the data store 145 or otherwise made available to the payment portal 120. In one example, the payment portal 120 can use the adjudicator module 360, for example, in conjunction with adjusted rebate rates determined by the dynamic rate module 355, invoice data 480 and/or adjustment factors 485 identified from the payment information 110, to determine an adjudicated rebate rate which can be applied to the payment transaction to determine a buyer rebate. In this example, the buyer rebate information can be provided to the buyer's issuer 105 for use by the issuer 150 in determining the rebate (discount) owed to the buyer 105, which the issuer 150 may report and/or refund to the buyer 105 on a periodic basis, for example, monthly, quarterly, etc.

The payment requests and/or confirmation data 155 for a respective buyer 105 can be consolidated into a report, which can be in the form of a message, a file such as an XML, XCL, ACH, CVS or other file format, for payments meeting one or more criteria specified by that respective merchant 160, where the reporting criteria can include, for example, all merchants 160 receiving payments from the respective buyer 105, a single merchant 160 or a group of merchants 160 receiving payments from the respective buyer 105, a specific time frame such as a day, week, month, quarter, year, etc., a specific geographic area such as a state, country, region, continent, etc., a merchant or buyer location and/or division such as a headquarters, sales office, manufacturing plant, distributor, etc., a currency type, and the like, where the specific report format requested by the buyer 105 can be associated with and/or provided by an associated reporting algorithm 185.

Referring to FIGS. 7 and 8, an exemplary process 700 for processing a payment on behalf of the merchant 160 is illustrated. In the illustrated example, an adjusted interchange rate 425 is applied to the payment information 110 to determine an adjusted interchange fee 465 applied to the payment transaction. For payment transactions which are not eligible for an adjusted interchange rate, the steps associated with determination and application of an adjusted interchange fee 465 are optional, for example, in the case of a non-card payment such as a wire transfer, ACH or check payment, where discounts are determined by agreement between the buyer 105 and merchant 160 and may be included in the payment message 500 and/or the payment information 110 or reconciled in a separate negotiation and/or transaction between the buyer 105 and merchant 160. As shown in FIGS. 7 and 8, the process 700 begins in a step 705, in which a buyer 105 (or an entity or proxy acting in behalf of the buyer 105) sends payment data 110, e.g., via the network 115 using payment message 500, which can be configured as an e-mail, an attachment to an e-mail, or some other mechanism such as described above, to the payment portal 120.

Next, in a step 710, the portal 120 receives the payment data sent in step 705.

Next, in a step 715, a parsing module 125 parses the payment data 110 received in step 710 using a identifying parsing algorithm 175 to obtaining identifying information from the payment data 110, which can include information identifying the buyer 105 sending the payment data 110 and/or the merchant 160 to whom the payment instructed by the payment data 110 is to be made. The parsing module 125 and/or the identifying parsing algorithm 175 can identify a destination email address, which can be a merchant assigned email 235, or other address or identifying information in the payment data 110 for use in matching the payment data 110 and/or payment message 500 to obtain a respective merchant profile table 200.

Next, in a step 720, the parsing module 125 or some other module or instructions included in the portal 120 determines whether a destination address or other identifying indicia parsed from the payment data 110 match data, for example, a merchant assigned email 235, in an assigned email field 205. If a merchant assigned email 235, a merchant ID 285 or like corresponding identifying information is found for the payment data 110, then step 724 is executed next. Otherwise, step 770 is executed next, returning the payment data 110 and/or payment message 500 to the buyer 105 for further action by the buyer 105, and ending the process, as described in further detail herein.

At step 724, the payment portal 120 and/or the parsing module 125, using the merchant identifying information parsed from the payment data at step 715, identifies the merchant profile table 200 corresponding to the merchant 160 identified from the payment message 500. Using a selected information parsing algorithm 275 associated in the data store 145 with the merchant 160, the merchant assigned email 235, and/or the merchant ID 285 associated with the merchant 160 identified from the payment data 110 in the payment message 500, the selected information parsing algorithm 275 parses the payment data 110 to identify, for example, information in the payment data 110 matching the payment data 110 to a record in a transaction reference table 300, by matching the payment data 110 to one or more of a merchant ID 285 in a merchant ID field 215, a payment application provider 165 in a source field 305, a buyer 105 in a buyer field 310, a vendor number 330 in a vendor number field 315, and/or the status of card data 345 as indicated in a card data status field 320, as described above. Further, the parsing module 125 and/or the information parsing algorithm 275 may identify other data such as described above, e.g., a card number or other payment card data 345, instructions for payments for one or more invoices, payment amounts for each invoice, etc.

In one example, the information parsing algorithm 275 may identify other data indicating to the parsing module 125 that the payment transaction is subject to application of an adjusted interchange rate 425. In this case, the parsing module 125, using a selected adjustment factors parsing algorithm 375 associated in the data store 145 with the merchant 160, the buyer 105, and the issuer 150 identified from the payment message 500, parses the payment data 110 to identify at least one adjustment factor 485 included with the payment message. The adjustment factor(s) 485 parsed from the payment message 500 are associated with the payment message 500 and/or the payment information 110 in the data store 145, for use in further processing of the payment transaction including determining an adjusted interchange rate 425 to be applied to the payment during process. In one example, an adjustable interchange rate table 400 is selected from a plurality of rate tables 400 and is associated in the data store 145 with the payment message 500, the payment information 110, and/or the adjustment factors 485 parsed from the payment message 500. At step 724, the parsing module 125, can, if indicated by the payment information 110, use a selected adjustment factors parsing algorithm 375 associated in the data store 145 with the buyer 105 and the buyer's issuer 150, to identify at least one adjustment factor 485 in the payment message 500 for use in determining an adjusted buyer rebate or discount based on the payment being processed. In one example, an adjustable rebate rate table 400 is selected from a plurality of rate tables 400 and is associated in the data store 145 with the payment message 500, the payment information 110, and/or the adjustment factors 485 parsed from the payment message 500.

Step 725 includes determining the form or type of payment application 290 indicated by the payment data 110 parsed from the payment message 500, including, for example, determining whether the portal 120 is to process a payment transaction identified in the payment data 110, or whether the one or more payment transactions identified in the payment data 110 are to be sent to a payment application provider 165 such as a card provider payment gateway, e.g., the MasterCard Payment Gateway. For example, payment data 110 will generally include an indicator that a transaction is a buyer initiated card payment (BICP), or such determination may be made where payment data 110 lacks a card number or other payment card information, in which case BICP module 140 may execute remaining steps of process 700. Using the information parsed from the payment data 110, and the respective record identified in the transaction reference table 300 as corresponding to the payment data 110, the payment portal identifies the payment application 290 and the selected one of the payment algorithms 180 to be used in processing the payment.

In some cases, the payment data 110 received with the payment message 500 may be an electronic file or the like that includes payment data 110 relating to multiple transactions possibly with multiple merchants 160. In that case, a merchant identifier 285, i.e., an address, a merchant name 230, or some other indicia identifying the merchant, may be included in the payment data 110. In an illustrative example, the identifying parsing algorithm 175 identifies multiple transactions and multiple merchants 160 in the payment data 110, such that the payment portal 120 can divide the payment data 110 into multiple subsets of payment data 110, each including only the payment data 110 related to a single merchant 160, for processing according to the method disclosed herein.

In step 730, information parsed from payment data 110 and/or identified from tables 200, 300, 400 using the parsed information is stored in the data store 145 and execution of the selected one of the payment algorithms 180 using the stored data is initiated. For example, in association with a merchant ID 285, a transaction amount 390, a payment transaction date 385, invoice information 340 including one or more of an invoice number 480, an invoice date 395, and an invoice amount 420, a payment application 290, adjustment factors 485 including for example, DSO 450 and/or a dollar size 455 of the transaction amount 390 or each invoice amount 420, and other information could be stored. This information may then be used by the payment card module 130 and/or the selected payment algorithm 180 to build a settlement file.

Next, in a step 735, the payment portal 120, e.g., the payment card module 130 and/or the selected payment algorithm 180, builds a settlement file including records representing the payment or payments authorized in the payment data 110. The settlement file usually follows an established flat file format, e.g., a comma separated value (CSV) format as directed by a VAR, such as the Electronic Data Interchange (EDI) modified 820 format used by a payment gateway. In one example, the settlement file can include a settlement output as shown in FIG. 10.

Next, in a step 736, the payment portal 120 using the dynamic rate module 355 and/or a settlement algorithm 350, applies the adjustment factors 485 parsed from the payment information 110 to the selected adjustable interchange table 400 to determine an adjusted interchange rate 425, which can include determining an adjusted interchange rate 425 for each transaction included in the payment information 110.

Next, in a step 737, the payment portal 120 using the dynamic rate module 355 and/or a settlement algorithm 350, applies the adjusted interchange rate(s) to the transaction(s) included in the payment information 110, to determine an adjusted interchange fee 465 for each transaction(s). In one example, at step 737, the payment portal 120 using the dynamic rate module 355, a reporting algorithm 185 and/or a settlement algorithm 350 generates the associated transaction report 460 reporting the adjusted interchange fee 465 applied to the payment transaction.

Next, in a step 738, in the case where different adjusted interchange rates 425 are determined for the multiple transactions and/or invoices included in the payment information 110, the payment portal 120 using the adjudicator module 360, a reporting algorithm 185 and/or a settlement algorithm 350 adjudicates the output from step 736, including the different adjusted interchange rates 425, to determine an adjudicated adjusted interchange rate 425 to be applied to the total payment amount parsed from the payment information 110 to determine an adjudicated adjusted interchange fee 465 for the payment transaction, and updates the associated transaction report 460 reporting the adjudicated adjusted interchange fee 465 applied to the payment transaction.

Next, in a step 740, the payment card module 130 and/or the selected payment algorithm 180 encrypts and sends the settlement file, e.g., via SFTP or FTPS, to an authorization and settlement module of a payment application provider 165 that is generally provided by or certified with a third party processor such as First Data Corp. or the like. In any event, the payment application provider 165 requests authorization from the appropriate issuer 150 for the requested payment or payments, and provides confirmation in response to the request for authorization. Occasionally, the authorization and settlement module returns a declination of a payment request.

In the event a file is generated to a card provider for buyer initiated payment processing where a standard, e.g., unadjusted interchange rate is being applied, only an electronic confirmation of receipt of file is received (see step 760) and no other action or steps need be taken as the respective gateway performing the payment processing also performs the confirmation of notification to the merchant 160 upon successfully processing the transaction.

Next, in a step 745, the payment portal 120 receives the response from the authorization and settlement module of approval or decline of the payment request and the adjusted interchange fee 465.

Next, in a step 750, the payment card module 130 and/or the selected payment algorithm 180 parses the response received in step 740.

Next, in a step 755, in the event any payment request and/or requested adjusted interchange fee was declined or there was some error in processing the transaction, the payment portal 120 and/or the payment card module 130 sends a communication, e.g., an email to the relevant help desk or customer service, to contact the buyer 105 and/or issuer 150 that provided the payment data 110.

Next, in a step 760, results received from the authorization and settlement module of the payment application provider 165 are stored in data store 145.

Next, in a step 765, confirmation data 155 is compiled by a selected reporting algorithm 185 associated with the payment data 110 to generate a notification report in a format specified by the merchant 160, and is sent to the merchant 160. In one example, the notification report is in the form of a confirmation email 600 as seen in FIG. 6.

Next, in a step 766, settlement data including the adjusted interchange fee 465 determined at step 737 is compiled by the dynamic rate module 355 and/or the payment portal 120, using in one example, a selected reporting algorithm 185 associated with the payment data 110, to generate an associated transaction report 460 in a format specified by the merchant 160, the issuing bank 150, and/or the payment application provider 165, and is sent to the merchant 160. In one example, settlement data is reported in the form of an associated transaction report 460 as shown in FIG. 11.

Next, in an optional step 767, the payment portal 120 using, for example, the dynamic rate module 355, a settlement algorithm 350 and/or a reporting algorithm 185 generates a rebate report for the payment transaction, using, for example, an adjustable rebate table 400 stored to the data store 145 to determine an adjusted rebate rate which is applied to the payment transaction to determine an adjusted buyer rebate amount for the payment transaction. The adjusted buyer rebate amount is compiled with other identifying payment transaction information, including information identifying the buyer 105 associated with the payment transaction, to produce a buyer rebate report which is sent from the payment portal 120 to the issuer 150.

Following optional step 767, the process 700 ends.

In step 770, which may follow step 720 as described above, the portal 120 forwards, e.g., returns, the received payment data 110 to the buyer 105, e.g., according to instructions in the non-identified merchant module 135. Step 770 is generally performed in the case in which payment data 110 includes transactions from a buyer 105 relating to multiple merchants 160, where some of the merchants 160 participate in the portal 120, i.e., are registered to the payment portal 120 and are listed in the data store 145, e.g., in a respective merchant profile table 200, and others of the merchants 160 in the payment data are not found in the data store 145 and/or are not registered to the payment portal 120.

Following step 770, the process 700 ends.

The process flow 700 shown in FIG. 7 is illustrative and non-limiting, such that it would be understood that the steps of the process flow 700 may be performed in a sequence other than as described herein, and the payment process system 100 described herein can include other process flows and methods incorporating combinations of the system elements described herein.

Computing devices such as servers 170 included in the portal 120, and servers 195, 245, 255, 270, 380 etc., may employ any of a number of computer operating systems, including, but by no means limited to, versions and/or varieties of the Microsoft Windows® operating system, the iOS by Apple Computer, Inc., Android by Google, Inc., the Unix operating system (e.g., the Solaris® operating system distributed by Sun Microsystems of Menlo Park, Calif.), the AIX UNIX operating system distributed by International Business Machines (IBM) of Armonk, N.Y., and the Linux operating system. Computing devices in general may include any one of a number of computing devices, including, without limitation, a computer workstation, a desktop, notebook, laptop, or handheld computer, or some other computing device.

Computing devices such as those discussed herein, including, for example, servers 170, 195, 245, 255, 270, 380 generally each include instructions executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, html, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases or data stores described herein, e.g., data store 145, etc., may include various kinds of mechanisms for storing, accessing, and retrieving various kinds of data, including a hierarchical database, a set of files in a file system, an application database in a proprietary format, a relational database management system (RDBMS), a non-relational database management system, etc. Each such database or data store is generally included within a computing device employing a computer operating system such as one of those mentioned above, and may be accessed via a network in any one or more of a variety of manners. A file system may be accessible from a computer operating system, and may include files stored in various formats. An RDBMS generally employs Structured Query Language (SQL) in addition to a language for creating, storing, editing, and executing stored procedures, such as the PL/SQL language mentioned above. Data store 145 may be any of a variety of known RDBMS packages, including IBMS DB2, or the RDBMS provided by Oracle Corporation of Redwood Shores, Calif. Non-relational database management systems may be any of a variety of known packages, including NoSQL, MongoDB, etc.

With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed teachings.

With regard to the modules, algorithms, etc. described herein, it should be understood that, although the data tables, modules, algorithms, etc. have been described as performing and/or being used in the performance of certain instructions, steps, etc., such instructions, steps, etc. could be practiced with the described instructions, e.g., performed within the computing device and/or the payment portal by a module and/or algorithm other than the module and/or algorithm named herein. It further should be understood that other modules and/or algorithms could be added, to perform the methods and processes described herein. In other words, the descriptions of processes herein are provided for the purpose of illustrating certain embodiments, and should in no way be construed so as to limit the claimed teachings.

Accordingly, it is to be understood that the above description is intended to be illustrative and not restrictive. Many embodiments and applications other than the examples provided would be apparent to those of skill in the art upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the present teachings are capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
   receiving, via a computing device including a payment portal, an encrypted payment message from a buyer, the payment message relating to a transaction with a merchant;
   wherein the encrypted payment message:
      is received by the payment portal directly from the buyer in an electronic format, or
      is received from a proxy directed by the buyer, wherein the proxy is one of an issuer or a payment provider;
   wherein the payment portal includes:
      a plurality of parsing algorithms including a first parsing algorithm and a second parsing algorithm;
   parsing, in the computing device and using the first parsing algorithm, the encrypted payment message to obtain merchant identifying information;
   wherein the merchant identifying information is associated in the payment portal with the second parsing algorithm;
   parsing, in the computing device and using the second parsing algorithm, the encrypted payment message to obtain payment information defined by the transaction;
   wherein the payment portal includes a plurality of payment algorithms;
   selecting, via the payment portal and using the at least one of the merchant identifying information or the payment information, a selected one of the payment algorithms from the plurality of payment algorithms;
   wherein the selected payment algorithm is associated in the payment portal with at least one of the merchant identifying information or the payment information;
   wherein the payment information includes a payment amount to be paid by the buyer to the merchant;
   compiling a settlement output, via the payment portal and using the selected payment algorithm;
   wherein the settlement output includes the payment amount;
   wherein the payment portal is in communication with at least one of a website of a payment application provider, a server of the payment application provider, an issuer website of the issuer, or an issuer server of the issuer;
   encrypting the settlement output, in the computer device and using the payment algorithm;
   transmitting, via the payment portal, a payment authorization request to the at least one of the payment application provider or the issuer; and
   wherein the payment authorization request is associated in the payment portal with the settlement output;
   receiving, via the payment portal, a response to the payment authorization request from the at least one of the website of the payment application provider, the server of the payment application provide, the issuer website of the issuer, or the issuer server of the issuer.

2. The method of claim 1, further comprising:
   wherein the payment portal includes a plurality of settlement algorithms;
   selecting, via the payment portal and using at least one of the merchant identifying information or the payment information, a selected one of the settlement algorithms from the plurality of settlement algorithms;
   wherein the selected settlement algorithm is associated in the payment portal with at least one of the merchant identifying information or the payment information; and
   determining, in the computing device, an adjusted interchange fee defined by an adjusted interchange rate and the payment information, using the selected settlement algorithm.

3. The method of claim 2,
   wherein the settlement output includes the payment amount and at least one of the adjusted interchange rate or the adjusted interchange fee.

4. The method of claim 2, further comprising:
wherein the payment portal includes a plurality of reporting algorithms;
selecting, via the payment portal and using the merchant identifying information and the payment information, a selected one or the reporting algorithms from the plurality of reporting algorithms;
wherein the selected reporting algorithm is associated in the payment portal with the merchant identifying information and the payment information; and
generating a merchant notification message, in the computing device and using the selected reporting algorithm and at least one of the settlement output, the payment authorization request, the merchant identifying information, or the payment information;
wherein the merchant notification message includes:
a notification of an approval of the payment authorization request,
the payment amount, and
at least one of the adjusted interchange rate or an adjusted interchange fee;
wherein the adjusted interchange fee is defined by the adjusted interchange rate.

5. The method of claim 4, further comprising:
transmitting the merchant notification message to the merchant, via the payment portal.

6. The method of claim 2, further comprising:
determining a buyer rebate, via the payment portal and using at least one of an adjustment factor or the adjusted interchange rate;
wherein the buyer rebate is determined by the adjusted interchange rate.

7. The method of claim 2, further comprising:
wherein the payment portal includes a plurality of rebate tables;
selecting, via the payment portal and using the merchant identifying information and the payment information, a selected one of the rebate tables from the plurality of rebate tables;
wherein the selected rebate table is associated in the payment portal with the buyer and the payment information;
determining an adjusted rebate rate for the buyer, in the computing device and using the rebate table and at least one of the adjusted interchange rate, or the settlement algorithm;
wherein the payment portal includes a plurality of reporting algorithms;
selecting, via the payment portal and using the merchant identifying information and the payment information, a selected one of the reporting algorithms from the plurality of reporting algorithms;
wherein the selected reporting algorithm is associated in the payment portal with the payment information; and
reporting, via the payment portal, the adjusted rebate rate determined for the buyer, to at least one of the payment application provider or the issuer.

8. The method of claim 2, wherein the payment portal includes a plurality of interchange rate tables;
the method further comprising:
selecting, via the payment portal and using the merchant identifying information and the payment information, a selected one of the interchange rate tables from the plurality of interchange rate tables;
wherein the selected interchange rate table is associated in the payment portal with the merchant identifying information and the payment information;
wherein at least one of the merchant identifying information or the payment information includes an interchange adjustment factor defined by the transaction; and
determining, in the computing device and using the selected interchange rate table and the interchange adjustment factor, the adjusted interchange rate.

9. The method of claim 8, further comprising:
wherein the transaction includes a plurality of transactions including a first transaction and a second transaction;
wherein the interchange adjustment factor includes a plurality of interchange adjustment factors including a first interchange adjustment factor associated by the payment information with the first transaction and a second interchange adjustment factor associated by the payment information with the second transaction;
determining a first adjusted interchange rate for the first transaction, in the computing device and using the selected interchange rate table and the first interchange adjustment factor; and
determining a second adjusted interchange rate for the second transaction, in the computing device and using the selected interchange rate table and the second interchange adjustment factor.

10. The method of claim 9, further comprising:
comparing the first adjusted interchange rate and the second adjusted interchange rate, in the computing device and using at least one of the settlement algorithm or the payment algorithm; and
wherein the first adjusted interchange rate is different than the second adjusted interchange rate, the method further comprising:
adjudicating, in the computing device and using the settlement algorithm, the first adjusted interchange rate and the second adjusted interchange rate to determine an adjudicated interchange rate; and
using the adjudicated interchange rate as the adjusted interchange rate for the transaction.

11. The method of claim 8, further comprising:
wherein the plurality of parsing algorithms includes a third parsing algorithm;
parsing, in the computing device and using the third parsing algorithm, the encrypted payment message to obtain the interchange adjustment factor.

12. The method of claim 11, further comprising:
parsing, in the computing device and using the third parsing algorithm, the payment information to obtain at least one of
days sales outstanding (DSO) for the transaction or
a payment amount for the transaction; and
wherein the interchange adjustment factor is defined by at least one of the days sales outstanding (DSO) or the payment amount.

13. The method of claim 8, further comprising:
wherein at least one of the merchant identifying information or the payment information includes an indication of at least one of a commodity, a market segment, a product segment, or a service segment associated with the transaction; and
wherein selected interchange rate table is associated in the payment portal with the at least one of the commodity, the market segment, the product segment, or the service segment.

14. The method of claim 1, wherein the response to the payment authorization request includes an approval of the payment authorization request when the payment authorization request is approved; or a declination of the payment authorization request, when the payment authorization request is declined;

the method further comprising:

reporting the declination of the payment authorization request, via the payment portal, directly to the buyer.

15. The method of claim 1, wherein the payment portal includes a plurality of merchant assigned emails;

the method further comprising:

determining, via the payment portal, whether the merchant identifying information matches a merchant assigned email of the plurality of merchant assigned emails; and wherein no match is determined, returning the payment message to the buyer.

16. An apparatus comprising a computing device having a processor and a memory, the memory storing thereon instructions executable by the processor such that the apparatus is configured to:

receive, via the computing device, an encrypted payment message from a buyer, the payment message relating to a transaction with a merchant;

wherein the computing device includes a payment portal, wherein the encrypted payment message:

is received by the payment portal directly from the buyer in an electronic format, or is received from a proxy directed by the buyer, wherein the proxy is one of an issuer or a payment provider;

wherein the payment portal includes:

a plurality of parsing algorithms including a first parsing algorithm and a second parsing algorithm;

parse, in the computing device and using the first parsing algorithm, the encrypted payment message to obtain merchant identifying information;

wherein the merchant identifying information is associated in the payment portal with the second parsing algorithm;

parse, in the computing device and using the second parsing algorithm, the encrypted payment message to obtain payment information defined by the transaction;

wherein the payment portal includes a plurality of payment algorithms; and the apparatus being further configured to:

select, via the payment portal and using the at least one of the merchant identifying information or the payment information, a selected payment algorithm from the plurality of payment algorithms;

wherein the selected payment algorithm is associated in the payment portal with at least one of the merchant identifying information or the payment information;

wherein the payment information includes a payment amount to be paid by the buyer to the merchant; and compile, via the payment portal and using at least one of the selected payment algorithm or a selected settlement algorithm, a settlement output;

wherein the settlement output includes the payment amount;

wherein the payment portal is in communication with at least one of a website of a payment application provider, a server of the payment application provider, an issuer website of the issuer, or an issuer server of the issuer;

wherein the payment portal is in communication with at least one of a website of the payment application provider, a server of the payment application provider, an issuer website of the issuer of a payment card, or an issuer server of the issuer;

the apparatus being further configured to:

encrypt, in the computer device and using the payment algorithm, the settlement output;

transmit, via the payment portal, a payment authorization request to the at least one of the payment application provider or the issuer;

wherein the payment authorization request is associated in the payment portal with the settlement output; and receive, via the payment portal, a response to the payment authorization request from at least one of the website of the payment application provider, the server of the payment application provider, the issuer website of the issuer of the payment card, or the issuer server of the issuer.

17. The apparatus of claim 16, wherein:

the payment portal includes a plurality of settlement algorithms; and the apparatus being further configured to:

select, via the payment portal and using the at least one of the merchant identifying information or the payment information, the selected settlement algorithm from the plurality of settlement algorithms;

wherein the selected settlement algorithm is associated in the payment portal with at least one of the merchant identifying information or the payment information; and determine, in the computing device and using the selected settlement algorithm, an adjusted interchange fee defined by an adjusted interchange rate and the payment information.

18. The apparatus of claim 17, wherein the settlement output includes the payment amount and at least one of the adjusted interchange rate or the adjusted interchange fee.

19. The apparatus of claim 18, wherein the response to the payment authorization request includes an approval of the payment authorization request when the payment authorization request is approved; or a declination of the payment authorization request, when the payment authorization request is declined;

the apparatus being further configured to:

report the declination of the payment authorization request, via the payment portal, directly to the buyer.

20. The apparatus of claim 16, wherein the payment portal includes a plurality of interchange rate tables;

the apparatus is configured to:

select, via the payment portal and using the merchant identifying information and the payment information, a selected interchange rate table from the plurality of interchange rate tables;

wherein the selected interchange rate table is associated in the payment portal with the merchant identifying information and the payment information;

wherein at least one of the merchant identifying information or the payment information includes an interchange adjustment factor defined by the transaction; and determine, in the computing device and using the selected interchange rate table and the interchange adjustment factor, the adjusted interchange rate.

* * * * *